(12) United States Patent
Murayama

(10) Patent No.: US 9,715,085 B2
(45) Date of Patent: Jul. 25, 2017

(54) EYEPIECE OPTICAL SYSTEM

(71) Applicant: RICOH IMAGING COMPANY, LTD., Tokyo (JP)

(72) Inventor: Minoru Murayama, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 8 days.

(21) Appl. No.: 14/889,990

(22) PCT Filed: Mar. 28, 2014

(86) PCT No.: PCT/JP2014/059149
§ 371 (c)(1),
(2) Date: Nov. 9, 2015

(87) PCT Pub. No.: WO2014/185171
PCT Pub. Date: Nov. 20, 2014

(65) Prior Publication Data
US 2016/0139361 A1 May 19, 2016

(30) Foreign Application Priority Data

May 15, 2013 (JP) .................................. 2013-102896

(51) Int. Cl.
*G02B 25/00* (2006.01)
*G02B 13/00* (2006.01)
(Continued)

(52) U.S. Cl.
CPC .............. *G02B 13/004* (2013.01); *G02B 9/34* (2013.01); *G02B 25/001* (2013.01); *G02B 27/0025* (2013.01)

(58) Field of Classification Search
CPC .................................................. G02B 13/004
(Continued)

(56) References Cited

U.S. PATENT DOCUMENTS 3,888,567 A 6/1975 Shoemaker
3,975,088 A 8/1976 Shoemaker
(Continued)

FOREIGN PATENT DOCUMENTS

JP 50-151163 12/1975
JP 52-18341 2/1977
(Continued)

OTHER PUBLICATIONS

Written Opinion of the International Searching Authority for PCT/JP2014/059149 having a mailing date of Jun. 17, 2014.
International Search Report, with English-language translation thereof, for PCT/JP2014/059149 having a mailing date of Jun. 17, 2014.

*Primary Examiner* — James Jones
(74) *Attorney, Agent, or Firm* — Greenblum & Bernstein, P.L.C.

(57) ABSTRACT

An eyepiece optical system is achieved that is suitable for an object image displayed on a miniaturized image display device and can magnify the object image to a high magnification ratio, the distance to the eyepoint is long while achieving a wide apparent visual angle at a short focal length, various aberrations can be favorably corrected while achieving a superior optical quality, and the pupil diameter can be enlarged. The eyepiece optical system includes a first lens element having a meniscus shape with a concave surface on the object side, a positive second lens element, a negative third lens element, and a positive fourth lens element, in that order from the object side toward the eye side.

11 Claims, 14 Drawing Sheets

(51) Int. Cl.
*G02B 9/34* (2006.01)
*G02B 27/00* (2006.01)

(58) Field of Classification Search
USPC .......................................................... 359/644
See application file for complete search history.

(56) References Cited

U.S. PATENT DOCUMENTS

| | | | |
|---|---|---|---|
| 4,099,842 A | 7/1978 | Kaneko | |
| 5,815,317 A * | 9/1998 | Omura | G02B 25/001 359/643 |
| 2010/0104272 A1 | 4/2010 | Ogino et al. | |
| 2010/0290129 A1 | 11/2010 | Nishio et al. | |
| 2011/0122502 A1 | 5/2011 | Nishio et al. | |

FOREIGN PATENT DOCUMENTS

| | | |
|---|---|---|
| JP | 52-72242 | 6/1977 |
| JP | 7-63997 | 3/1995 |
| JP | 7-311351 | 11/1995 |
| JP | 9-54259 | 2/1997 |
| JP | 9-80325 | 3/1997 |
| JP | 9-197298 | 7/1997 |
| JP | 9-251130 | 9/1997 |
| JP | 2008-203290 | 9/2008 |
| JP | 2010-134446 | 6/2010 |
| JP | 2010-217589 | 9/2010 |
| JP | 2010-266776 | 11/2010 |

* cited by examiner

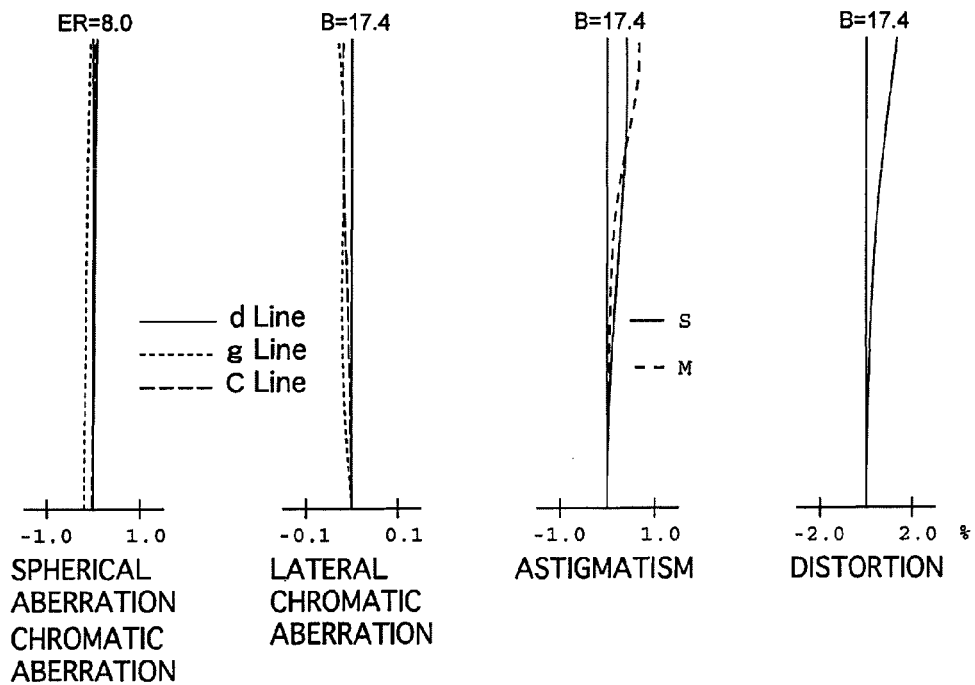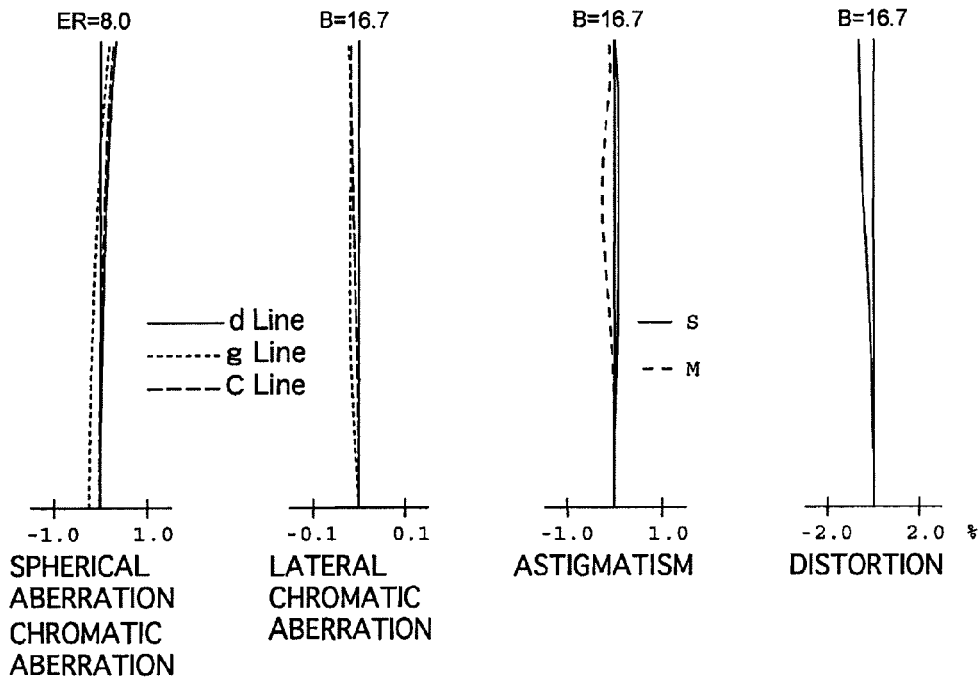

SPHERICAL ABERRATION CHROMATIC ABERRATION

LATERAL CHROMATIC ABERRATION

ASTIGMATISM

DISTORTION

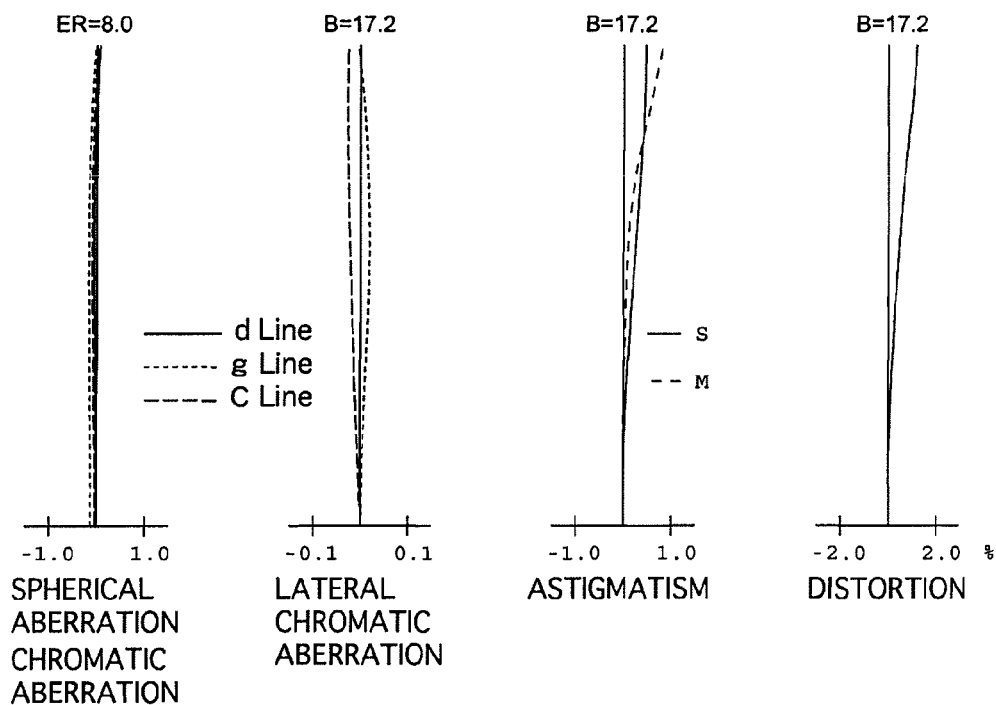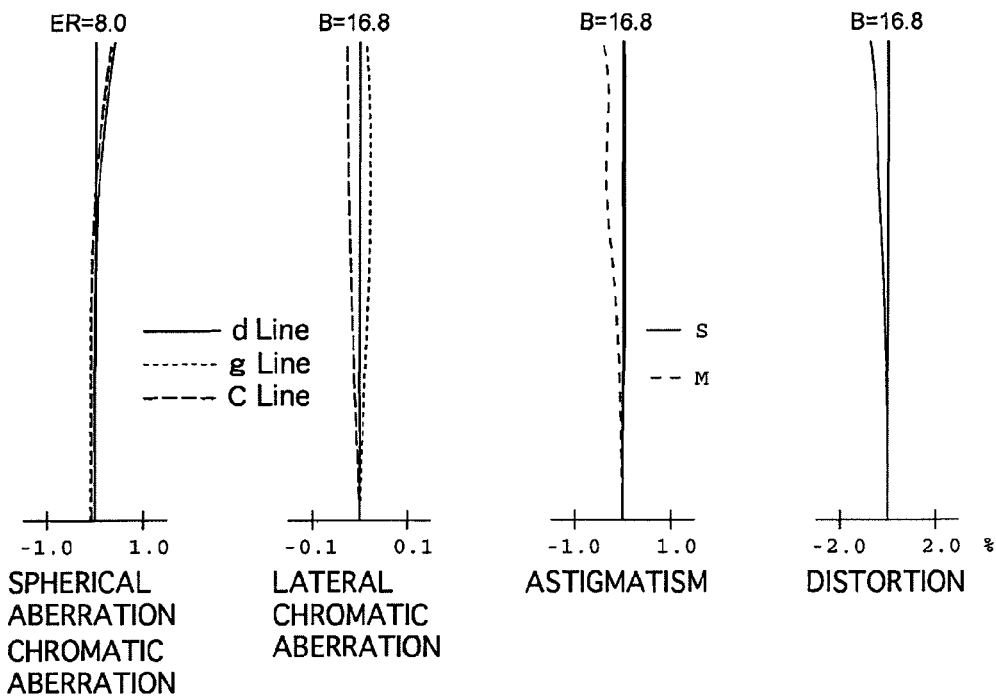

SPHERICAL    LATERAL       ASTIGMATISM    DISTORTION
ABERRATION   CHROMATIC
CHROMATIC    ABERRATION
ABERRATION

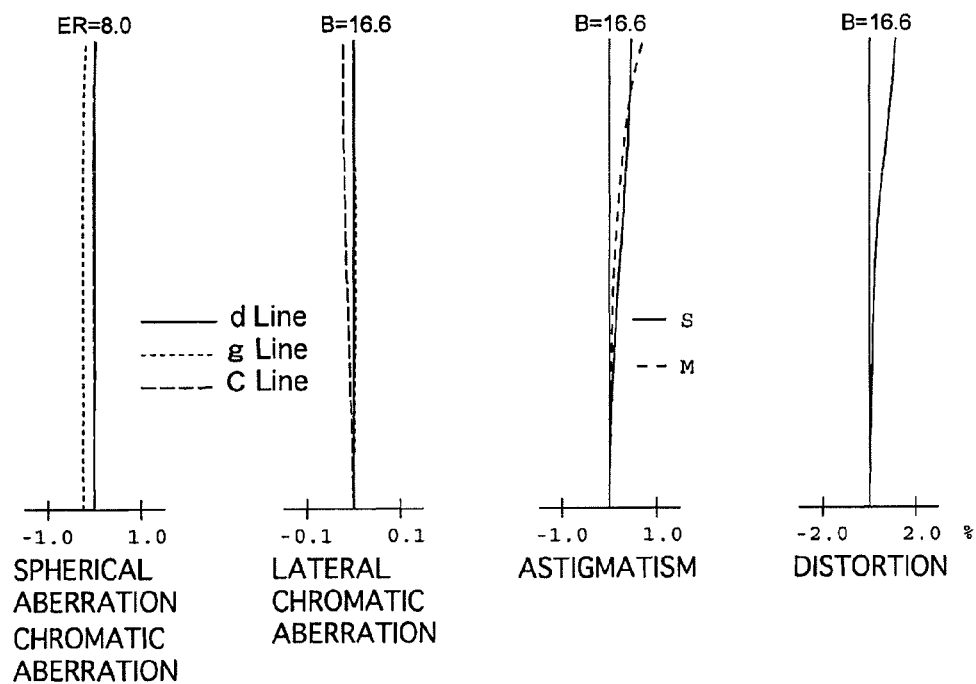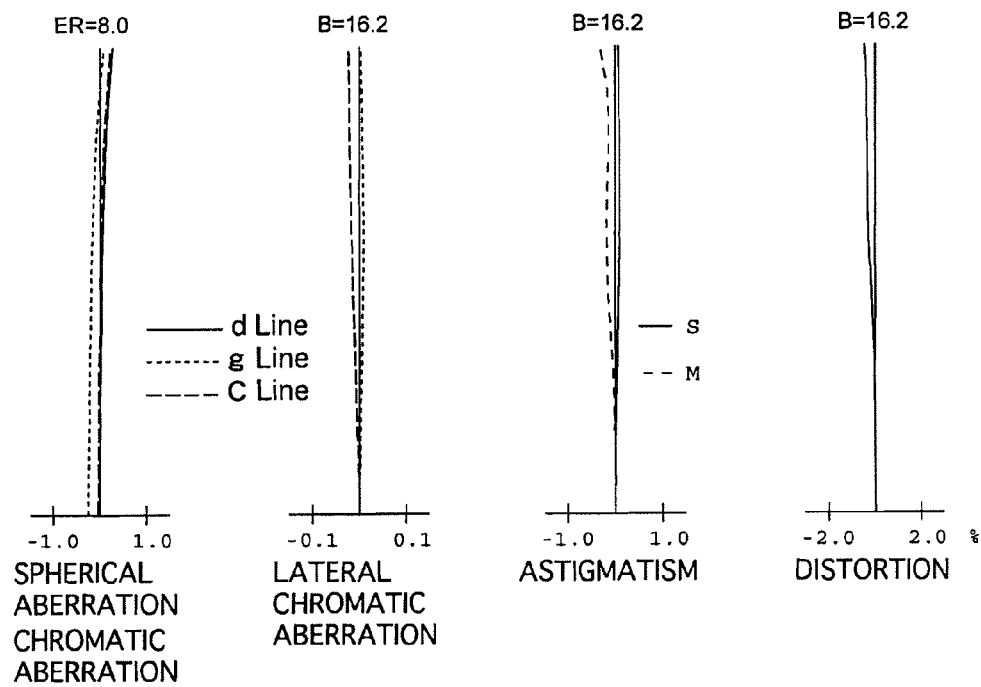

Fig.13
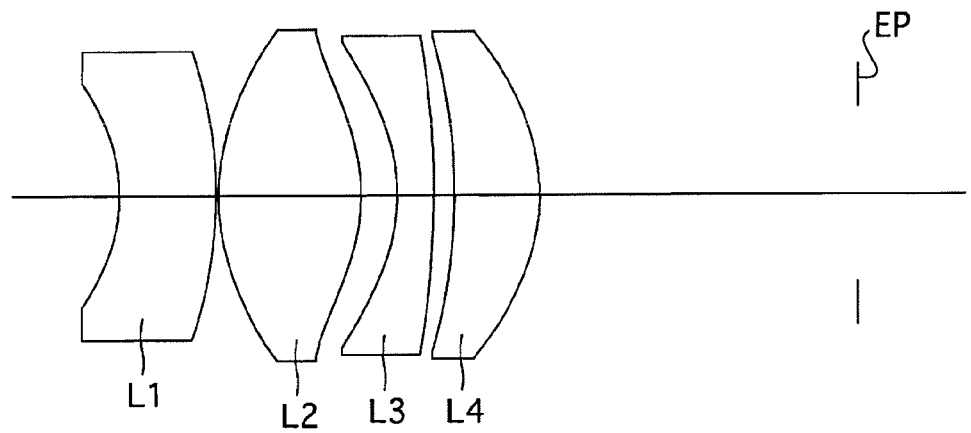
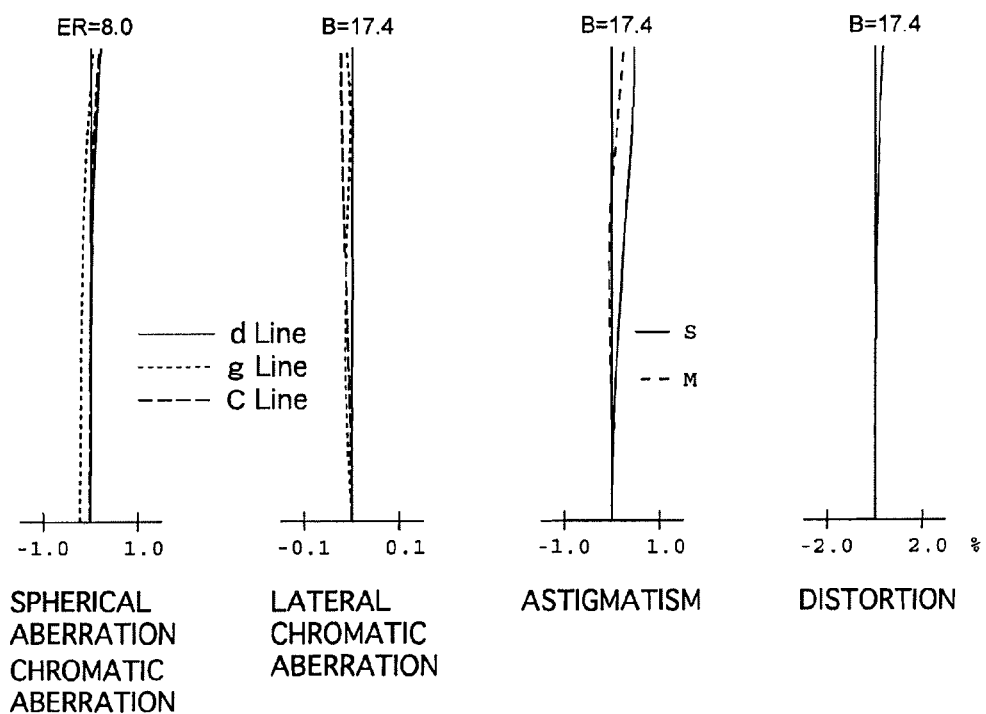

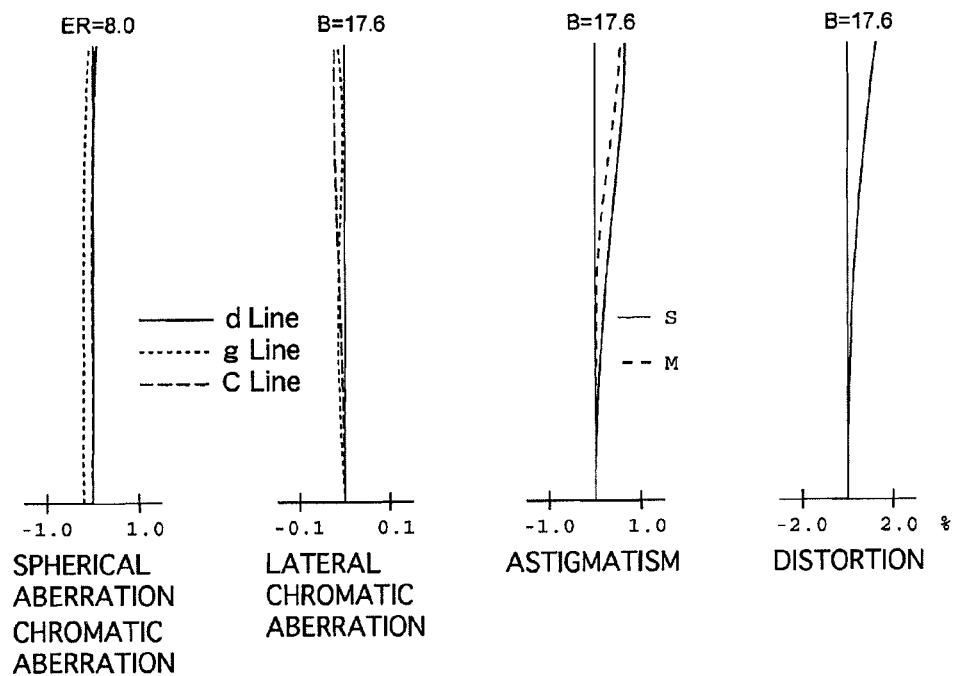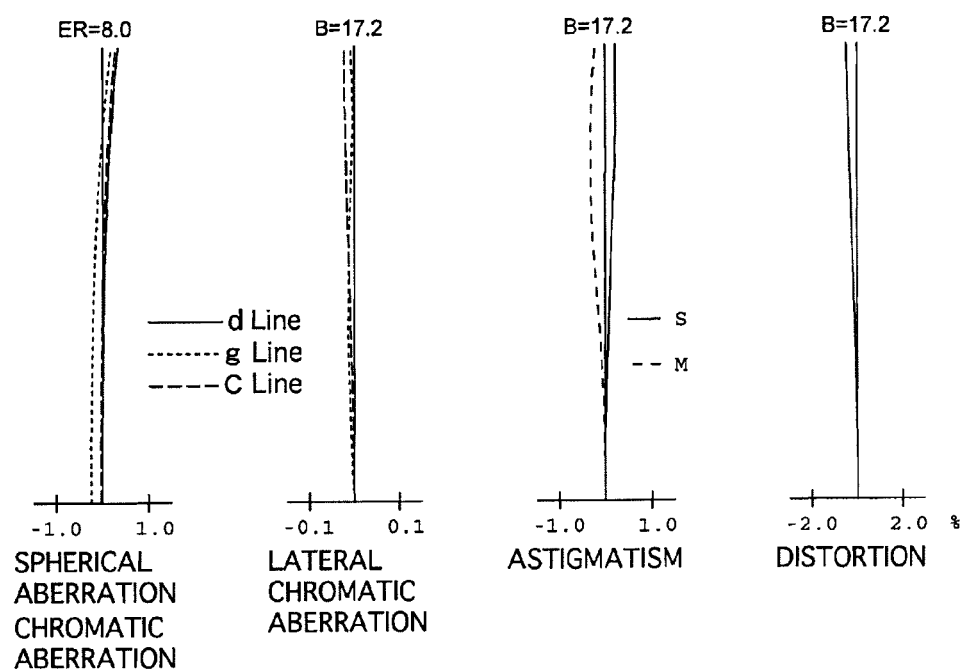

SPHERICAL        LATERAL         ASTIGMATISM      DISTORTION
ABERRATION       CHROMATIC
CHROMATIC        ABERRATION
ABERRATION

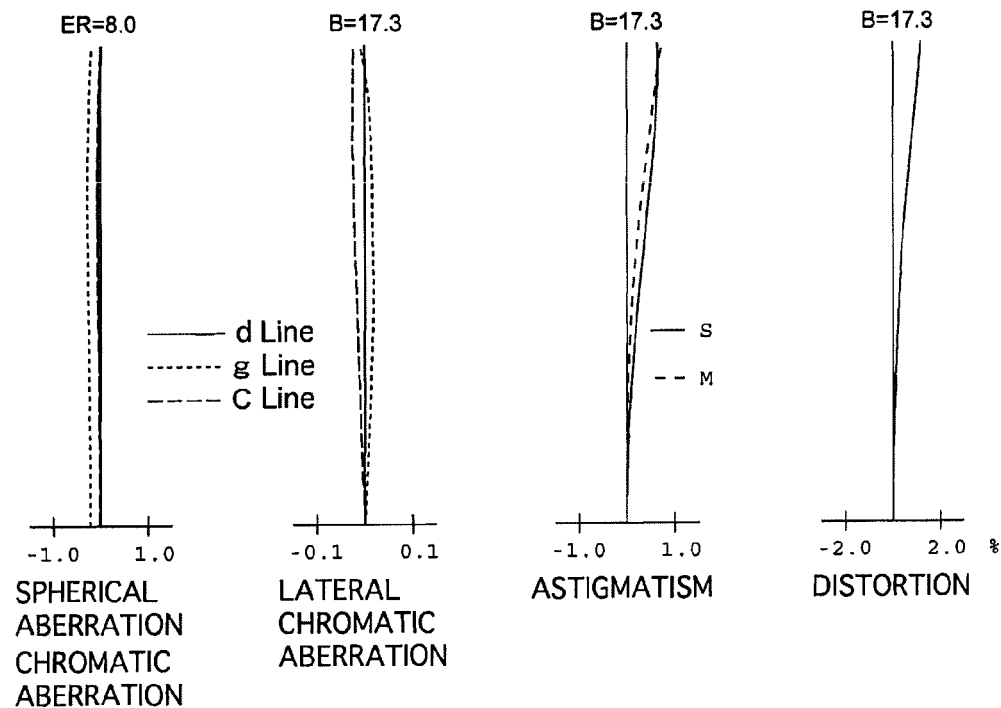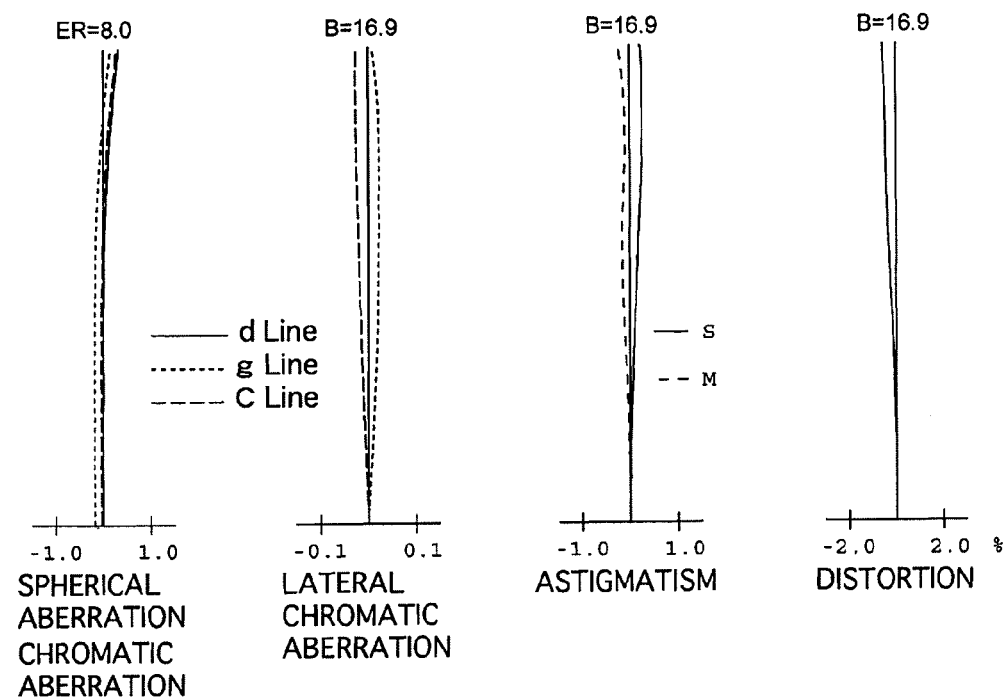

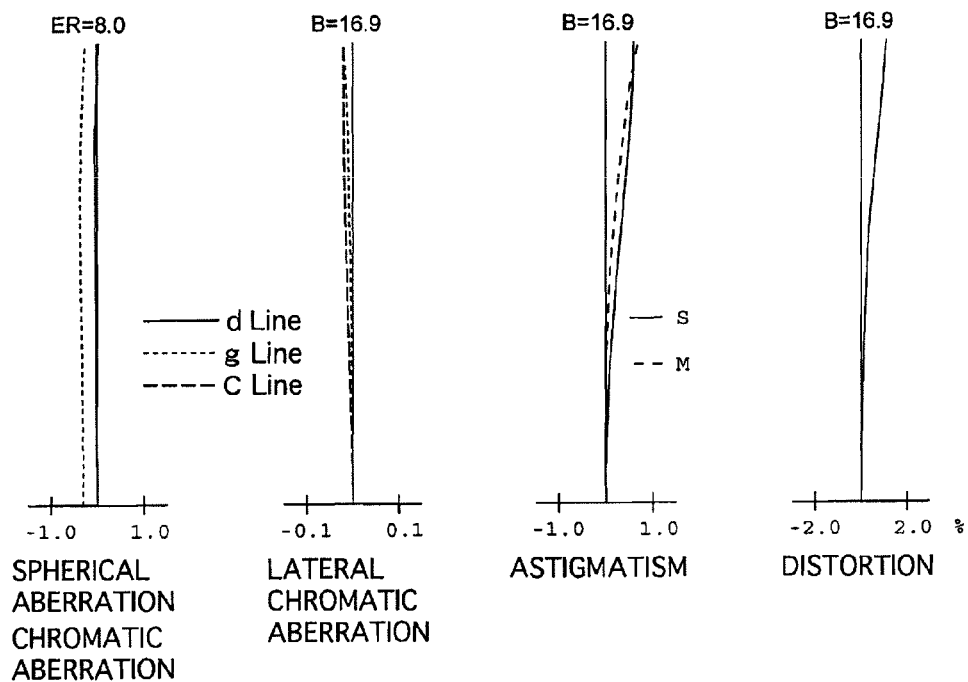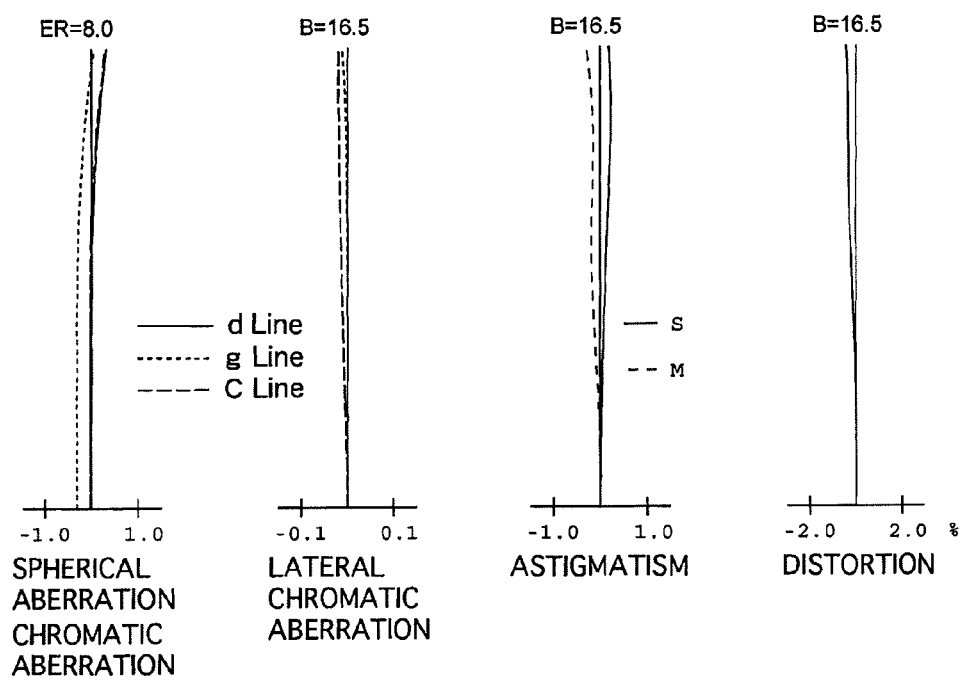

SPHERICAL      LATERAL        ASTIGMATISM    DISTORTION
ABERRATION     CHROMATIC
CHROMATIC      ABERRATION
ABERRATION

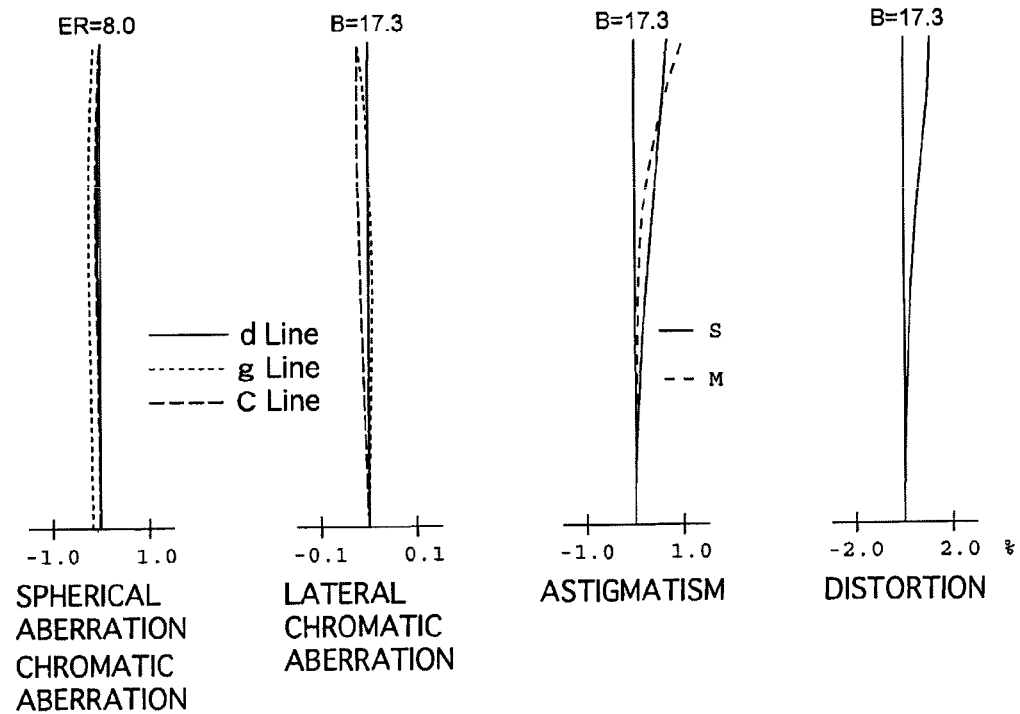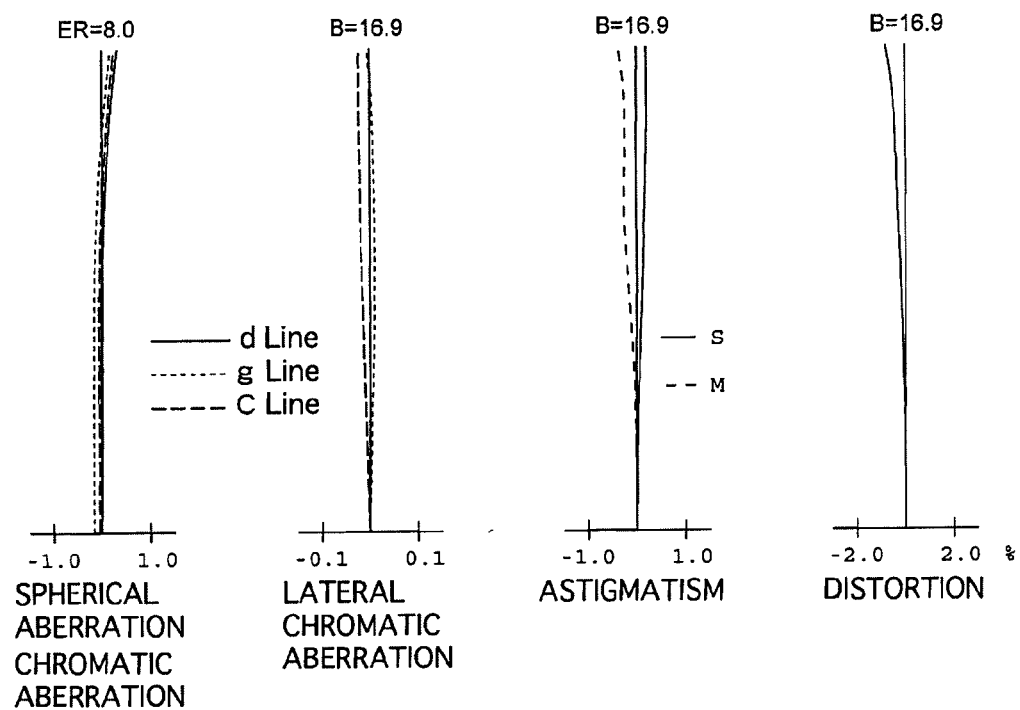

EYEPIECE OPTICAL SYSTEM

TECHNICAL FIELD

The present invention relates to an eyepiece optical system for magnified viewing of an object, and also relates to an eyepiece optical system that is ideal for use in an electronic view finder of a digital camera, a video camera, a digital telescope or digital binoculars, etc.

BACKGROUND ART

An eyepiece optical system configured of a negative lens element, a positive lens element and a positive lens element (three lens elements), in that order from the object side to the eye side (Patent Literature 1), an eyepiece optical system configured of a positive lens element, a negative lens element and a positive lens element (three lens elements), in that order from the object side to the eye side (Patent Literature 2 and 3), and an eyepiece optical system configured of a negative lens element, positive lens element, a negative lens element and a positive lens element (four lens elements), in that order from the object side to the eye side (Patent Literature 4) are known in art as examples of an eyepiece optical system for magnified viewing of an object that is displayed on a miniature image display device such as a screen, a focal plane plate, an LCD or an organic EL device, etc.

In such an eyepiece optical system, a view is demanded in which the apparent visual angle is enlarged by magnifying the object image to a certain extent. In particular, in the case of the image display device, which displays an object image on an electronic viewfinder, having a horizontal rectangular shape with an aspect ratio of 16:9, etc., since the size of the image display device appears smaller than for an image display device having an aspect ratio of 4:3 at the same magnification, a higher magnification ratio is demanded. Hence, it is conceivable to increase the apparent visual angle by reducing the focal length of the eyepiece optical system. Furthermore, in order to achieve a miniaturized electronic viewfinder, a miniaturized image display device can be utilized, thereby reducing the focal length of the eyepiece optical system. Whereas, since an eyepiece optical system is directly viewed by the user's eye, if the distance to the eyepoint or the pupil diameter is reduced in proportion to the focal length, shading can easily occur with a slight shift in position of the user's eye and aberrations increase, causing difficulties in viewing.

The eyepiece optical system of Patent Literature 1 teaches a lens arrangement configured of a negative lens element, a positive lens element and a positive lens element (i.e., three lens elements); however, the apparent visual angle is only 25 degrees (which is small), and since the pupil diameter is small, if the position of the user's eye shifts in a direction orthogonal to the optical axis, shading or deterioration in the optical quality easily occurs.

The eyepiece optical system of Patent Literature 2 teaches a triplet lens arrangement provided with a positive lens element, a negative lens element and a positive lens element, and although the apparent visual angle is wider than that of Patent Literature 1, since the refractive power of the middle negative lens element is too weak, correction of aberrations is insufficient and the pupil diameter is small.

The eyepiece optical system of Patent Literature 3 also teaches a triplet lens arrangement provided with a positive lens element, a negative lens element and a positive lens element, and although the refractive power of the middle negative lens element is strengthened, the apparent visual angle is only 28 degrees (which is small). Furthermore, in order to increase the apparent visual angle while maintaining the aberration quality and the eyepoint position, it is necessary to increase the refractive power of each lens element, so that the aberration correction is insufficient, thereby deteriorating optical quality.

The eyepiece optical system of Patent Literature 4 teaches a lens arrangement configured of a negative lens element, a positive lens element, a negative lens element and a positive lens element (i.e., four lens elements); however, since a large image display device having a diagonal size of approximately 90 mm is utilized, enlargement of the apparatus including the eyepiece optical system is unavoidable. Furthermore, since the profile and refractive power of the negative lens element that is provided closest to the object side is inappropriate, telecentricity is deteriorated and the apparent visual angle cannot be widened without using a large image display device.

CITATION LIST

Patent Literature

Patent Literature 1: Japanese Unexamined Patent Publication No. 2010-217589

Patent Literature 2: Japanese Unexamined Patent Publication No. 2010-134446

Patent Literature 3: Japanese Unexamined Patent Publication No. 2010-266776

Patent Literature 4: Japanese Unexamined Patent Publication No. 2008-203290

SUMMARY OF INVENTION

Technical Problem

The present invention has been devised in view of the above-described problems and an object of the present invention is to achieve an eyepiece optical system which is suitable for an object image displayed on a miniaturized image display device and can magnify the object image to a high magnification ratio, the distance to the eyepoint being long while achieving a wide apparent visual angle at a short focal length, various aberrations can be favorably corrected while achieving a superior optical quality, and the pupil diameter can be enlarged.

Solution to Problem

In an embodiment, an eyepiece optical system of the present invention includes a first lens element having a meniscus shape with a concave surface on the object side, a positive second lens element, a negative third lens element, and a positive fourth lens element, in that order from the object side toward the eye side, wherein the following conditions (2) and (3) are satisfied:

$$-1.55 < f/R12 < -0.7 \qquad (2), \text{ and}$$

$$-1.25 < f/f3 < -0.8 \qquad (3),$$

wherein f designates the focal length of the entire eyepiece optical system, and R12 designates the paraxial radius-of-curvature of the surface on the eye side of the first lens element, and f3 designates the focal length of the third lens element.

It is desirable for the eyepiece optical system to satisfy the following condition (6):

$$-2.5 < SF4 < -0.8 \qquad (6),$$

wherein SF4=(r42+r41)/(r42−r41), r41 designates the paraxial radius-of-curvature of the surface on the object side of the fourth lens element, and r42 designates the paraxial radius-of-curvature of the surface on the eye side of the fourth lens element.

It is desirable for the eyepiece optical system to satisfy the following condition (1):

$$-1.0 < f/f1 < 0.07 \qquad (1),$$

wherein f designates the focal length of the entire eyepiece optical system, and f1 designates the focal length of the first lens element.

It is desirable for the eyepiece optical system to satisfy the following condition (4):

$$-0.45 < SF2 < 0.25 \qquad (4),$$

wherein SF2=(r22+r21)/(r22−r21), r21 designates the paraxial radius-of-curvature of the surface on the object side of the second lens element, and r22 designates the paraxial radius-of-curvature of the surface on the eye side of the second lens element.

It is desirable for the eyepiece optical system to satisfy the following condition (5):

$$0.8 < SF3 < 1.55 \qquad (5),$$

wherein

SF3=(r32+r31)/(r32−r31), r31 designates the paraxial radius-of-curvature of the surface on the object side of the third lens element, and r32 designates the paraxial radius-of-curvature of the surface on the eye side of the third lens element.

It is desirable for the second lens element to include an aspherical surface on the eye side thereof, wherein the aspherical surface reduces in curvature, relative to the paraxial spherical surface, at positions increasingly farther away from the optical axis.

It is desirable for the third lens element to include an aspherical surface on the object side thereof, wherein the aspherical surface reduces in curvature, relative to the paraxial spherical surface, at positions increasingly farther away from the optical axis.

It is desirable for the fourth lens element to include an aspherical surface on the eye side thereof, wherein the aspherical surface reduces in curvature, relative to the paraxial spherical surface, at positions increasingly farther away from the optical axis.

The eyepiece optical system according to the present invention can be configured so that the first lens element is a negative meniscus lens element having a concave surface on the object side, the second lens element is a biconvex positive lens element, the third lens element is a negative meniscus lens element having a concave surface on the object side, and the fourth lens element is a positive meniscus lens element having a concave surface on the object side.

Alternatively, the eyepiece optical system according to the present invention can be configured so that the first lens element is a positive meniscus lens element having a concave surface on the object side, the second lens element is a biconvex positive lens element, the third lens element is a negative meniscus lens element having a concave surface on the object side, and the fourth lens element is a positive meniscus lens element having a concave surface on the object side.

Alternatively, the eyepiece optical system according to the present invention can be configured so that the first lens element is a negative meniscus lens element having a concave surface on the object side, the second lens element is a biconvex positive lens element, the third lens element is a biconcave negative lens element, and the fourth lens element is a biconvex positive lens element.

In the eyepiece optical system of the present invention, it is desirable for the following condition (7) to be satisfied:

$$0.28 < H/f \qquad (7),$$

wherein

H designates the object height on the image display device (half of the diagonal length), and f designates the focal length of said eyepiece optical system.

In the eyepiece optical system of the present invention, an aspherical surface can be formed on the object side of the first lens element and/or the object side of the second lens element.

In the eyepiece optical system of the present invention, it is desirable for the first through fourth lens elements to be integrally moved during a diopter adjustment operation.

In the eyepiece optical system of the present invention, it is desirable for the first lens element and the third lens element to be formed from the same material, and for the second lens element and the fourth lens element to be formed from the same material.

An electronic viewfinder, to which the present invention is applied, is provided with an image display device which displays an image via an electrical image signal, and any one of the above-described eyepiece optical systems for viewing a magnified image that is displayed on the image display device.

Advantageous Effects of Invention

According to the present invention, an eyepiece optical system can be achieved which is suitable for an object image displayed on a miniaturized image display device and can magnify the object image to a high magnification ratio, the distance to the eyepoint being long while achieving a wide apparent visual angle at a short focal length, various aberrations can be favorably corrected while achieving a superior optical quality, and the pupil diameter can be enlarged.

BRIEF DESCRIPTION OF DRAWINGS

FIGS. 3A, 3B, 3C and 3D show various aberrations that occurred in the lens arrangement of FIG. 1 at a diopter of −4;

FIGS. 4A, 4B, 4C and 4D show various aberrations that occurred in the lens arrangement of FIG. 1 at a diopter of +2;

FIGS. 7A, 7B, 7C and 7D show various aberrations that occurred in the lens arrangement of FIG. 5 at a diopter of −4;

FIGS. 8A, 8B, 8C and 8D show various aberrations that occurred in the lens arrangement of FIG. 5 at a diopter of +2;

FIGS. 11A, 11B, 11C and 11D show various aberrations that occurred in the lens arrangement of FIG. 9 at a diopter of −4;

FIGS. 12A, 12B, 12C and 12D show various aberrations that occurred in the lens arrangement of FIG. 9 at a diopter of +2;

FIG. 13 shows a lens arrangement of a fourth numerical embodiment of an eyepiece optical system, according to the present invention;

FIGS. 14A, 14B, 14C and 14D show various aberrations that occurred in the lens arrangement of FIG. 13 at a diopter of −1;

FIGS. 15A, 15B, 15C and 15D show various aberrations that occurred in the lens arrangement of FIG. 13 at a diopter of −4;

FIGS. 16A, 16B, 16C and 16D show various aberrations that occurred in the lens arrangement of FIG. 13 at a diopter of +2;

FIGS. 19A, 19B, 19C and 19D show various aberrations that occurred in the lens arrangement of FIG. 17 at a diopter of −4;

FIGS. 20A, 20B, 20C and 20D show various aberrations that occurred in the lens arrangement of FIG. 17 at a diopter of +2;

FIGS. 23A, 23B, 23C and 23D show various aberrations that occurred in the lens arrangement of FIG. 21 at a diopter of −4;

FIGS. 24A, 24B, 24C and 24D show various aberrations that occurred in the lens arrangement of FIG. 21 at a diopter of +2;

FIGS. 27A, 27B, 27C and 27D show various aberrations that occurred in the lens arrangement of FIG. 25 at a diopter of −4; and FIGS. 28A, 28B, 28C and 28D show various aberrations that occurred in the lens arrangement of FIG. 25 at a diopter of +2.

DESCRIPTION OF EMBODIMENTS

Figure 1:
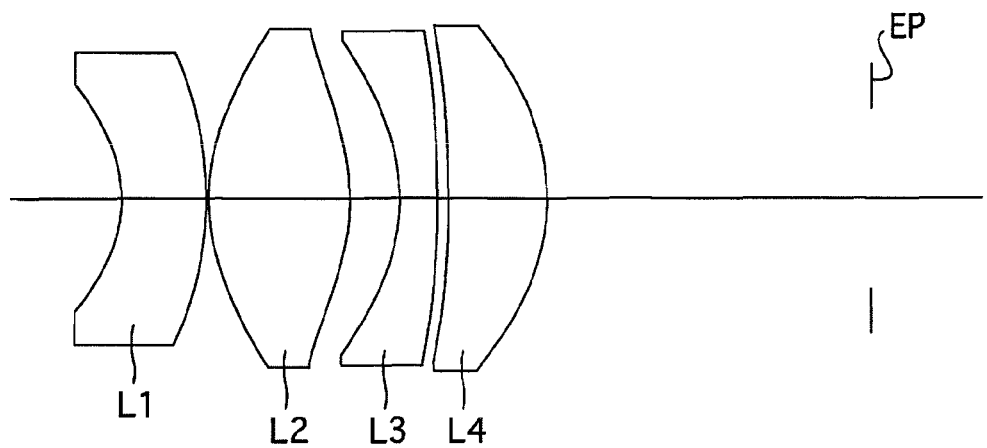
FIG. 1 shows a lens arrangement of a first numerical embodiment of an eyepiece optical system, according to the present invention.
Figures 2A, 2B, 2C, 2D:
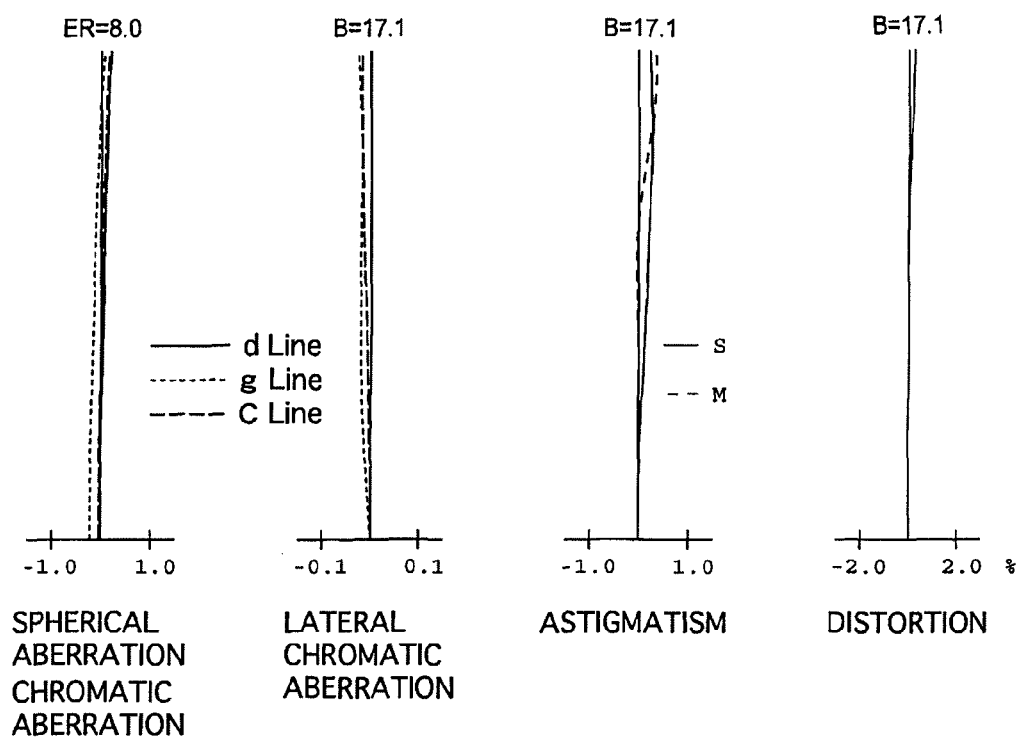
FIGS. 2A, 2B, 2C and 2D show various aberrations that occurred in the lens arrangement of FIG. 1 at a diopter of −1.

An image display device (not shown), such as a screen, a focal plane plate, an LCD or an organic EL device, etc., is positioned at a predetermined position on the object side of an eyepiece optical system according to the first through seventh numerical embodiments, shown in FIGS. 1, 5, 9, 13, 17, 21 and 25; in the case of an LCD or an organic EL device, etc., an image of an object that is to be magnified by the eyepiece optical system is displayed via electric image signals onto the image display device. The eyepiece optical system is for magnifying and viewing an image that is displayed on the image display device. 'EP' designates the eyepoint. Furthermore, although not shown in the drawings, it is possible to provide a cover glass for the image display device on the object side of the eyepiece optical system, and a protective cover glass on the eye side of the eyepiece optical system.

In the first through fourth and sixth numerical embodiments shown in FIGS. 1, 5, 9, 13 and 21, the eyepiece optical system is configured of a first lens element L1 which is a negative meniscus lens element having a concave surface on the object side, a second lens element L2 which is a biconvex positive lens element, a third lens element L3 which is a negative meniscus lens element having a concave surface on the object side, and a fourth lens element L4 which is a positive meniscus lens element having a concave surface on the object side, in that order from the object side toward the eye side.

Figure 17:
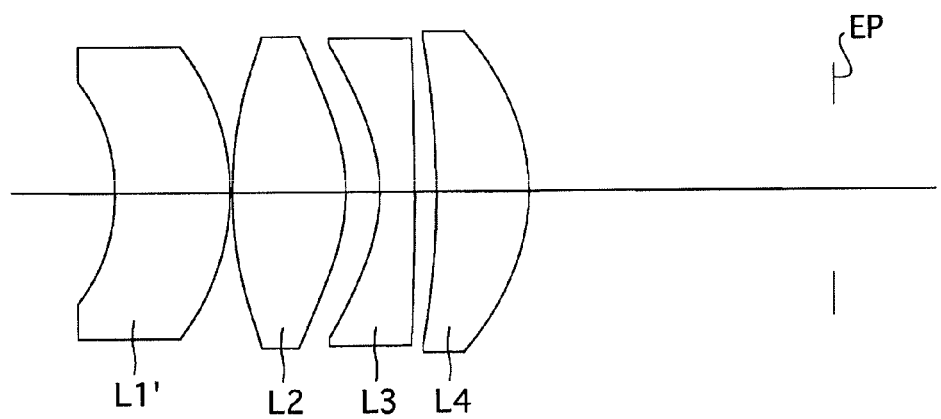
FIG. 17 shows a lens arrangement of a fifth numerical embodiment of an eyepiece optical system, according to the present invention.
Figures 18A, 18B, 18C, 18D:
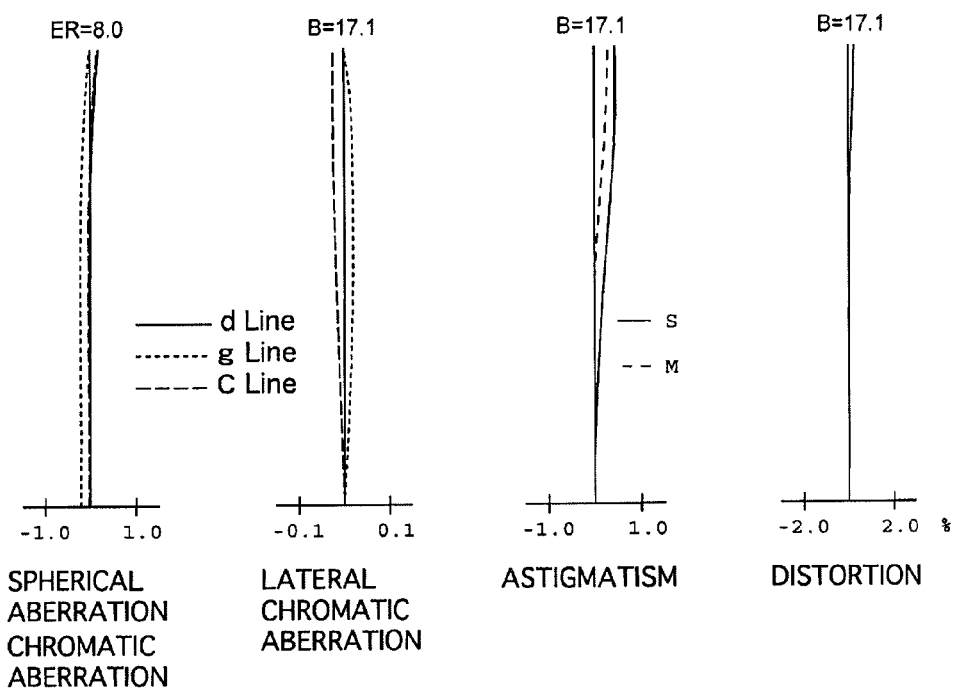
FIGS. 18A, 18B, 18C and 18D show various aberrations that occurred in the lens arrangement of FIG. 17 at a diopter of −1.

In the fifth numerical embodiment shown in FIG. 17, the eyepiece optical system is configured of a first lens element L1' which is a positive meniscus lens element having a concave surface on the object side, a second lens element L2 which is a biconvex positive lens element, a third lens element L3 which is a negative meniscus lens element having a concave surface on the object side, and a fourth lens element L4 which is a positive meniscus lens element having a concave surface on the object side, in that order from the object side toward the eye side.

Figure 25:
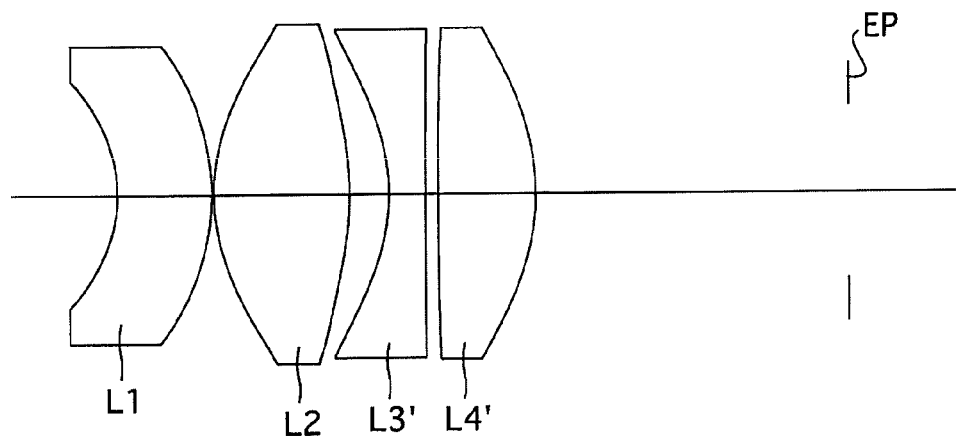
FIG. 25 shows a lens arrangement of a seventh numerical embodiment of an eyepiece optical system, according to the present invention.
Figures 26A, 26B, 26C, 26D:
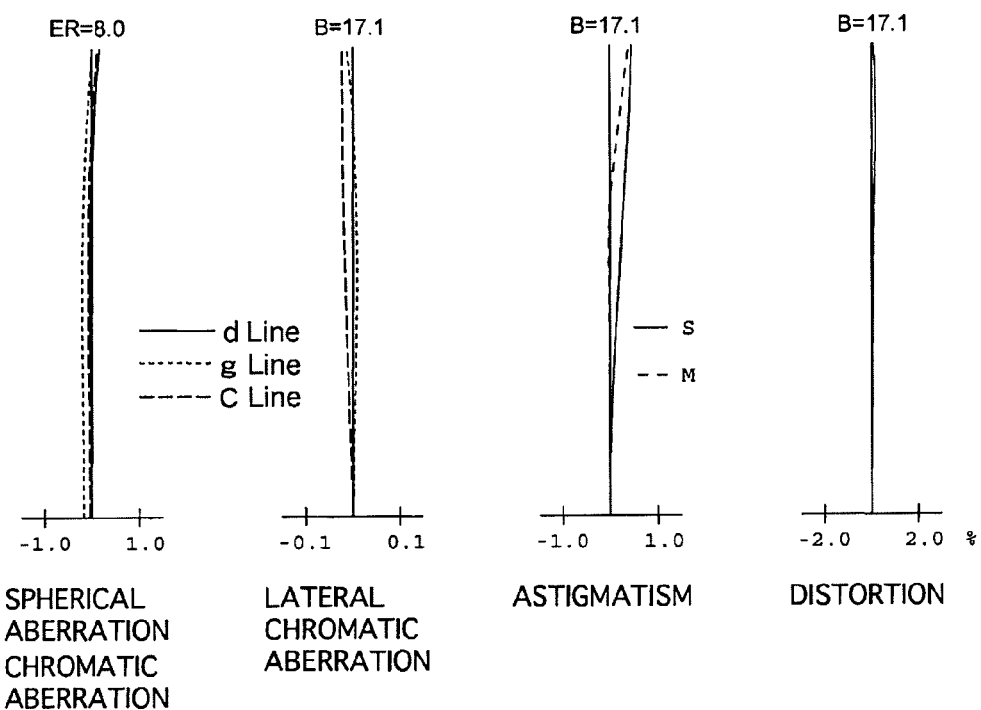
FIGS. 26A, 26B, 26C and 26D show various aberrations that occurred in the lens arrangement of FIG. 25 at a diopter of −1.

In the seventh numerical embodiment shown in FIG. 25, the eyepiece optical system is configured of a first lens element L1 which is a negative meniscus lens element having a concave surface on the object side, a second lens element L2 which is a biconvex positive lens element, a third lens element L3' which is a biconcave negative lens element, and a fourth lens element L4' which is a biconvex positive lens element, in that order from the object side toward the eye side.

The first lens element L1 and the first lens element L1' are each provided with an aspherical surface on the object side thereof. An aspherical surface is provided on each side of the second lens element L2. The third lens element L3 and the third lens element L3' are each provided with an aspherical surface on the object side thereof. The fourth lens element L4 and the fourth lens element L4' are each provided with an aspherical surface on the eye side thereof. The aspherical surface on the eye side of the second lens element L2 reduces in curvature, relative to the paraxial spherical surface, at positions increasingly farther away from the optical axis. The aspherical surface on the object side of each of the third lens element L3 and the third lens element L3' reduces in curvature, relative to the paraxial spherical surface, at positions increasingly farther away from the optical axis. The aspherical surface on the eye side of each of the fourth lens element L4 and the fourth lens element L4' reduces in curvature, relative to the paraxial spherical surface, at positions increasingly farther away from the optical axis.

Taking into account that the height of the abaxial light rays at the last lens surface only needs to increase in order to attain a wide apparent visual angle while increasing the distance to the eyepoint EP, it is imperative for the eyepiece optical system of the illustrated embodiments to have a lens arrangement configured of a first lens element L1 or a first lens element L1' having a meniscus shape with a concave surface on the object side, combined with a triplet lens element, i.e., a negative lens element, a positive lens element and a negative lens element (the second lens element L2, the third lens element L3 or the third lens element L3', and the fourth lens element L4 or the fourth lens element L4'), in that order from the object side to the eye side. According to this configuration, telecentricity at the object side can be maintained, a wide apparent visual angle can be achieved while increasing the distance to the eyepoint EP by smoothly increasing the height of the abaxial light rays, and a superior optical quality due to favorable correction of various aberrations have successfully been achieved.

Since the surface on the object side of the first lens element L1 or the first lens element L1' is a concave surface having a strong negative refractive power, various aberrations such as distortion can be favorably corrected by forming an aspherical surface on this concave surface.

In the illustrated embodiments, since the incident ray height of the abaxial light rays at the second lens element L2 is increased due to the meniscus shape of the first lens element L1 or the first lens element L1', the abaxial light rays are thereafter smoothly bend toward the optical axis by configuring the second lens element L2 of a biconvex positive lens element. Furthermore, by configuring the second lens element L2 to have an aspherical surface on each side thereof, and in particular, by forming the aspherical surface on the eye side of the second lens element L2 so that the curvature thereof, relative to the paraxial spherical surface, reduces at positions increasingly farther away from the optical axis, favorable correction of aberrations can be achieved.

If the negative third lens element were to have a profile having a strong refractive-powered concave surface on the eye side, the height of the abaxial light rays at the second lens element L2 becomes higher than necessary, so that large amounts of aberrations such as coma occur. Hence, in the illustrated embodiments, the third lens element L3 and the third lens element L3' each have a profile of a concave surface having a small paraxial radius-of-curvature on the object side thereof (a negative meniscus lens element having a concave surface on the object side or a biconcave negative lens element). Furthermore, by forming the aspherical surface on the object-side surface, which has a strong refractive-power, of the third lens element L3 and the third lens element L3' so that the curvature thereof, relative to the paraxial spherical surface, reduces at positions increasingly farther away from the optical axis, favorable correction of aberrations can be achieved.

In order to attain a long distance to the eyepoint EP and a wide apparent visual angle, the height of the abaxial light rays at the eye side of the positive fourth lens element L4 and fourth lens element L4' is increased, and the exit angle thereof is increased. Namely, in the illustrated embodiments, if the positive refractive power of the surface on the object side of the fourth lens element were to be too strong, the height of the abaxial light rays at the surface on the eye side would become low, and hence, a strong positive refractive power is provided on the surface on the eye side of the fourth lens element L4 and the fourth lens element L4'. Furthermore, by forming an aspherical surface on the eye side of the surface that has a strong refractive power of the fourth lens element L4 and the fourth lens element L4' so that the curvature thereof, relative to the paraxial spherical surface, reduces at positions increasingly farther away from the optical axis, various aberrations such as distortion, coma and astigmatism, etc., can be favorably corrected.

In the eyepiece optical system of the illustrated embodiments, it is desirable for the first lens element L1 or the first lens element L1', the second lens element L2, the third lens element L3 or the third lens element L3', and the fourth lens element L4 or the fourth lens element L4' to integrally move during a diopter adjustment. Due to the abaxial light rays passing through each lens element at a high position, if not all of the lens elements are moved to perform a diopter adjustment, the balance between the moved lens element(s) and the other lens elements is lost, so that fluctuation in the aberrations increase.

From the viewpoint of cost reduction in the molding of the aspherical surfaces and weight reduction thereof, etc., it is desirable for a resin material to be used for the lens elements that constitute the eyepiece optical system of the illustrated embodiments. When forming the lens elements, a further cost reduction can be achieved by forming the first lens element L1, the first lens element L1', the third lens element L3 and the third lens element L3' with the same material, and by forming the second lens element L2, the fourth lens element L4 and the fourth lens element L4' with the same material.

By combining the eyepiece optical system of the illustrated embodiments with the image display device (which displays an image using electric image signals) to configure an electronic viewfinder, an electronic viewfinder can be achieved in which a long distance to the eyepoint EP and a wide apparent visual angle can be attained, and various aberrations can be favorably corrected.

Condition (1) specifies the ratio of the focal length of the entire eyepiece optical system to the focal length of the first lens element L1 or the first lens element L1'. By satisfying condition (1), various aberrations such as field curvature, distortion, lateral chromatic aberration and coma can be favorably corrected and telecentricity can be maintained, thereby achieving a superior optical quality.

If the upper limit of condition (1) is exceeded, the Petzval sum becomes large, thereby increasing field curvature. Furthermore, the negative refractive power of the concave surface on the object side of the first lens element L1' weakens, thereby making it difficult to correct distortion.

If the lower limit of condition (1) is exceeded, the negative refractive power of the first lens element L1 becomes too strong, so that the lateral chromatic aberration becomes overcorrected, and telecentricity is deteriorated in order not to increase the height of the abaxial light rays more than necessary. Furthermore, the positive refractive power of the second lens element L2 is (must be) strengthened, thereby causing a large amount of coma to occur.

Condition (2) specifies the ratio of the focal length of the entire eyepiece optical system to the paraxial radius-of-curvature of the surface on the eye side of the first lens element L1 or the first lens element L1'. By satisfying condition (2), various aberrations such as field curvature, astigmatism and lateral chromatic aberrations are favorably corrected to thereby achieve a superior optical quality, and the range by which a diopter adjustment can be performed can be increased.

If the upper limit of condition (2) is exceeded, the negative refractive power of the concave surface on the object side of the first lens element L1 or the first lens element L1' becomes too weak, so that field curvature and astigmatism increase.

If the lower limit of condition (2) is exceeded, lateral chromatic aberration increases. Furthermore, the paraxial radius-of-curvature on the concave surface on the object side of the first lens element L1 or the first lens element L1' becomes too small, causing the space between the object (image display device) and the first lens element L1 or the first lens element L1' to shorten, thereby reducing the range in which a diopter adjustment can be performed.

Condition (3) specifies the ratio of the focal length of the entire eyepiece optical system to the focal length of the third lens element L3 or the third lens element L3'. By satisfying condition (3), various aberrations such as field curvature, coma, spherical aberration, axial chromatic aberration and lateral chromatic aberration can be favorably corrected, thereby achieving a superior optical quality.

If the upper limit of condition (3) is exceeded, the negative refractive power of the third lens element L3 or the third lens element L3' becomes too weak, so that correction field curvature and coma is insufficient.

If the lower limit of condition (3) is exceeded, the negative refractive power of the third lens element L3 or the third lens element L3' becomes too strong, so that spherical aberration, axial chromatic aberration and lateral chromatic aberration become overcorrected, and high-order coma occurs.

Condition (4) specifies the profile (shaping factor) of the second lens element L2. By satisfying condition (4), various aberrations such as spherical aberration, coma and astigmatism are favorably corrected, so that a superior optical quality can be achieved.

If the upper limit of condition (4) is exceeded, the refractive power of the surface on the object side of the second lens element L2 becomes too strong, so that a large amount of spherical aberration occurs.

If the lower limit of condition (4) is exceeded, the refractive power of the surface on the eye side of the second lens element L2 becomes too strong, so that high-order coma and astigmatism increase.

Condition (5) specifies the profile (shaping factor) of the third lens element L3 or the third lens element L3'. By satisfying condition (5), various aberrations such as coma, axial chromatic aberration and lateral chromatic aberration, etc., are favorably corrected, so that a superior optical quality can be achieved.

If the upper limit of condition (5) is exceeded, the negative refractive power of the surface on the object side of the third lens element L3 or the third lens element L3' becomes too strong, so that high-order coma increases.

If the lower limit of condition (5) is exceeded, axial chromatic aberration becomes overcorrected, and it becomes difficult to attain a balance between axial chromatic aberration and lateral chromatic aberration.

Condition (6) specifies the profile (shaping factor) of the fourth lens element L4 or the fourth lens element L4'. By satisfying condition (6), various aberrations such as field curvature, coma and astigmatism can be favorably corrected, so that a superior optical quality can be achieved.

If the upper limit of condition (6) is exceeded, the Petzval sum becomes large and field curvature increases.

If the lower limit of condition (6) is exceeded, the negative refractive power of the surface on the object side of the fourth lens element L4 or the fourth lens element L4' becomes too strong, so that as a result of the abaxial light ray height changing greatly from the third lens element L3 or the third lens element L3' to the eye side of the fourth lens element L4 or the fourth lens element L4', coma and astigmatism increase.

Condition (7) designates the ratio of the object height (half the diagonal length) on the image display device, etc., to the focal length of the entire eyepiece optical system; in other words, condition (7) specifies the focal length of the entire eyepiece optical system for attaining a wide apparent visual angle. If the lower limit of condition (7) is exceeded, a wide apparent visual angle cannot be attained.

EMBODIMENTS

Specific first through seventh numerical embodiments will be herein discussed. In the various aberration diagrams and the tables, the d-line, g-line and C-line show aberrations at their respective wave-lengths; S designates the sagittal image, M designates the meridional image, ER designates the pupil diameter, f designates the focal length of the entire optical system, H designates the object height on the image display device (half of the diagonal length), B designates the exit angle (°), R designates the radius of curvature, d designates the lens thickness or distance between lenses, N(d) designates the refractive index at the d-line, and ν(d) designates the Abbe number with respect to the d-line. The unit used for lengths is defined in millimeters (mm). The pupil diameter ER, the focal length f, the object height H, the exit angle B and the lens thickness or distance between lenses d are shown in the following order: when the diopter is −1, when the diopter is −4, and when the diopter is +2.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'c' designates the curvature (1/r), 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and 'x' designates the amount of sag.

Numerical Embodiment 1

FIGS. 1 through 4D and Tables 1 through 4 show a first numerical embodiment of the eyepiece optical system according to the present invention. FIG. 1 shows the lens arrangement, FIGS. 2A, 2B, 2C and 2D show various aberration diagrams at a diopter of −1, FIGS. 3A, 3B, 3C and 3D show various aberration diagrams at a diopter of −4, and FIGS. 4A, 4B, 4C and 4D show various aberration diagrams at a diopter of +2. Table 1 shows the lens surface data, Table 2 shows the aspherical surface data, Table 3 shows various lens-system data, and Table 4 shows distance/thickness data.

An image display device (not shown), such as a screen, a focal plane plate, an LCD or an organic EL device, etc., is positioned on the object side of an eyepiece optical system; in the case of an LCD or an organic EL device, an image of an object that is to be magnified by the eyepiece optical system is displayed via electric image signals onto the image display device. The eyepiece optical system is for magnifying and viewing an image that is displayed on the image display device. 'EP' designates the eyepoint.

The first numerical embodiment of the eyepiece optical system is configured of a first lens element L1 which is a negative meniscus lens element having a concave surface on the object side, a second lens element L2 which is a biconvex positive lens element, a third lens element L3 which is a negative meniscus lens element having a concave surface on the object side, and a fourth lens element L4 which is a positive meniscus lens element having a concave surface on the object side, in that order from the object side toward the eye side.

The first lens element L1 is provided with an aspherical surface on the object side thereof. An aspherical surface is formed on each side of the second lens element L2. The third lens element L3 is provided with an aspherical surface on the object side. The fourth lens element L4 is provided with an aspherical surface on the eye side. The aspherical surface on the eye side of the second lens element L2 reduces in curvature, relative to the paraxial spherical surface, at positions increasingly farther away from the optical axis. The aspherical surface on the object side of the third lens element L3 reduces in curvature, relative to the paraxial spherical surface, at positions increasingly farther away from the optical axis. The aspherical surface on the eye side of the fourth lens element L4 reduces in curvature, relative to the paraxial spherical surface, at positions increasingly farther away from the optical axis.

TABLE 1

SURFACE DATA

| Surf. No. | R | d | N (d) | ν (d) |
|---|---|---|---|---|
| Object | ∞ | d0 | | |
| 1* | −5.936 | 3.736 | 1.62133 | 24.9 |
| 2 | −15.838 | 0.100 | | |
| 3* | 8.966 | 6.342 | 1.52538 | 56.3 |
| 4* | −9.409 | 2.260 | | |
| 5* | −8.408 | 1.700 | 1.62133 | 24.9 |
| 6 | −42.864 | 0.500 | | |
| 7 | −41.540 | 4.425 | 1.52538 | 56.3 |
| 8* | −9.640 | d8 | | |
| EP | ∞ | — | | |

TABLE 2

ASPHERICAL SURFACE DATA

| Surf. No. | K | A4 | A6 | A8 | A10 |
|---|---|---|---|---|---|
| 1 | 0.000 | 0.5818E−03 | 0.2065E−04 | −0.5040E−06 | 0.1996E−07 |
| 3 | 0.000 | −0.4635E−03 | 0.2405E−05 | −0.1404E−07 | −0.4128E−09 |
| 4 | 0.000 | 0.6187E−03 | −0.2784E−05 | 0.4633E−07 | −0.1025E−09 |
| 5 | 0.000 | 0.3351E−03 | 0.1164E−05 | 0.6606E−08 | 0.5481E−09 |
| 8 | 0.000 | 0.7655E−04 | 0.2200E−05 | −0.1626E−07 | 0.2334E−09 |

TABLE 3

LENS SYSTEM DATA

| Diopter | −1 | −4 | +2 |
|---|---|---|---|
| ER | φ8 | φ8 | φ8 |
| f | 16.01 | 16.01 | 16.01 |
| H | 4.89 | 4.89 | 4.89 |
| B | 17.1 | 17.4 | 16.7 |
| Eye Relief | 14.424 | 15.194 | 13.654 |

TABLE 4

DISTANCE/THICKNESS DATA

| Diopter | −1 | −4 | +2 |
|---|---|---|---|
| d0 | 5.370 | 4.600 | 6.140 |
| d8 | 14.424 | 15.194 | 13.654 |

Numerical Embodiment 2

Figure 5:
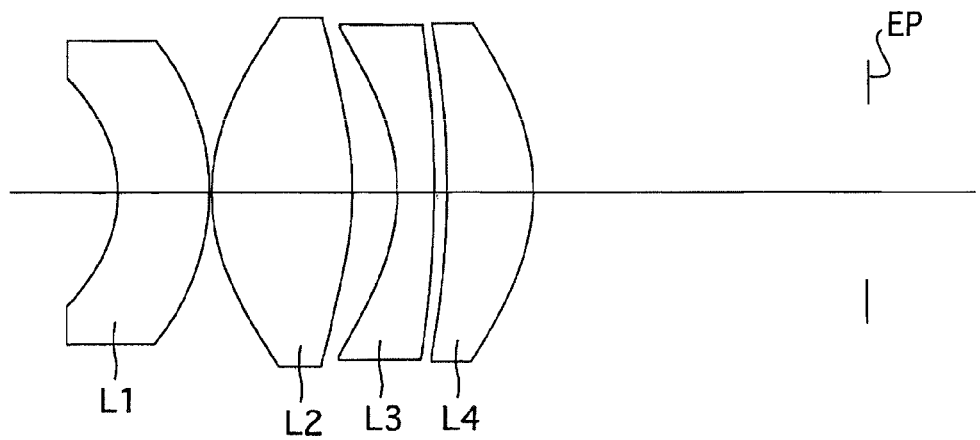
FIG. 5 shows a lens arrangement of a second numerical embodiment of an eyepiece optical system, according to the present invention.
Figures 6A, 6B, 6C, 6D:
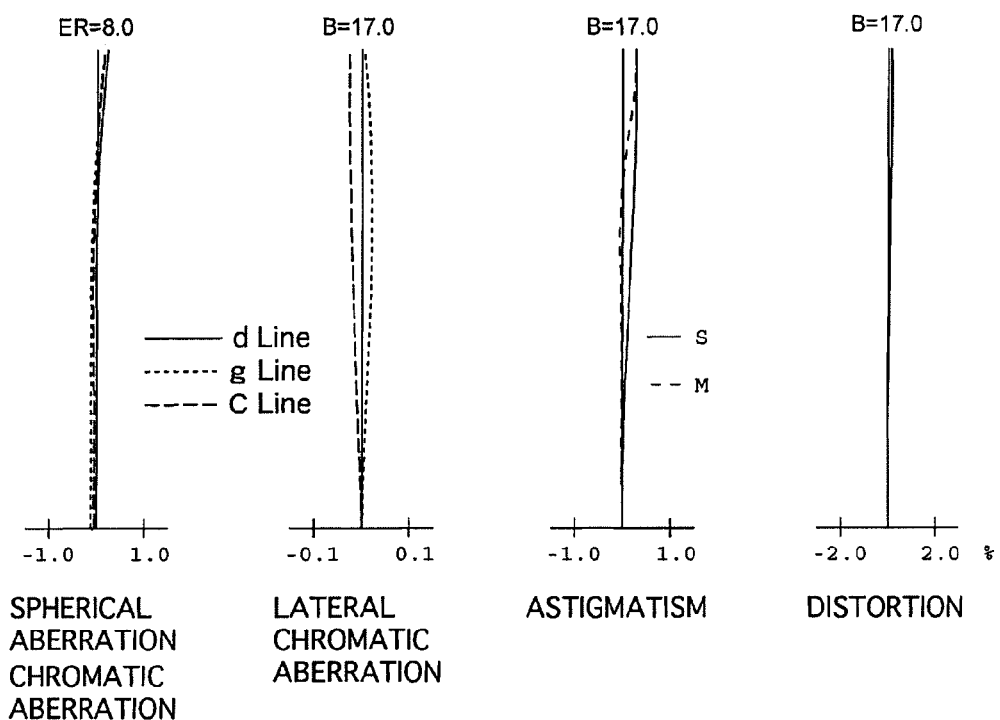
FIGS. 6A, 6B, 6C and 6D show various aberrations that occurred in the lens arrangement of FIG. 5 at a diopter of −1.

FIGS. 5 through 8D and Tables 5 through 8 show a second numerical embodiment of the eyepiece optical system according to the present invention. FIG. 5 shows the lens arrangement, FIGS. 6A, 6B, 6C and 6D show various aberration diagrams at a diopter of −1, FIGS. 7A, 7B, 7C and 7D show various aberration diagrams at a diopter of −4, and FIGS. 8A, 8B, 8C and 8D show various aberration diagrams at a diopter of +2. Table 5 shows the lens surface data, Table 6 shows the aspherical surface data, Table 7 shows various lens-system data, and Table 8 shows distance/thickness data.

The lens arrangement of the second numerical embodiment is the same as that of the first numerical embodiment.

TABLE 5

SURFACE DATA

| Surf. No. | R | d | N (d) | ν (d) |
|---|---|---|---|---|
| Object | ∞ | d0 | | |
| 1* | −6.128 | 4.177 | 1.63278 | 23.3 |
| 2 | −10.807 | 0.100 | | |
| 3* | 9.591 | 6.380 | 1.52538 | 56.3 |
| 4* | −13.875 | 2.042 | | |
| 5* | −9.285 | 1.700 | 1.63278 | 23.3 |
| 6 | −50.190 | 0.596 | | |
| 7 | −40.361 | 3.972 | 1.52538 | 56.3 |
| 8* | −10.045 | d8 | | |
| EP | ∞ | — | | |

TABLE 6

ASPHERICAL SURFACE DATA

| Surf. No. | K | A4 | A6 | A8 | A10 |
|---|---|---|---|---|---|
| 1 | 0.000 | 0.2363E−03 | 0.2010E−04 | −0.4108E−06 | 0.1124E−07 |
| 3 | 0.000 | −0.1392E−03 | −0.3733E−05 | 0.8004E−07 | −0.9368E−09 |
| 4 | 0.000 | 0.4224E−03 | −0.4805E−05 | 0.8716E−07 | −0.8254E−09 |
| 5 | 0.000 | 0.2128E−03 | 0.3806E−07 | 0.6958E−07 | −0.4402E−09 |
| 8 | 0.000 | 0.1065E−03 | 0.8161E−06 | 0.2316E−07 | −0.7340E−10 |

TABLE 7

LENS SYSTEM DATA

| Diopter | −1 | −4 | +2 |
|---|---|---|---|
| ER | φ8 | φ8 | φ8 |
| f | 16.00 | 16.00 | 16.00 |
| H | 4.89 | 4.89 | 4.89 |
| B | 17.0 | 17.2 | 16.8 |
| Eye Relief | 15.202 | 15.980 | 14.434 |

TABLE 8

DISTANCE/THICKNESS DATA

| Diopter | −1 | −4 | +2 |
|---|---|---|---|
| d0 | 6.150 | 5.372 | 6.918 |
| d8 | 15.202 | 15.980 | 14.434 |

Numerical Embodiment 3

Figure 9:
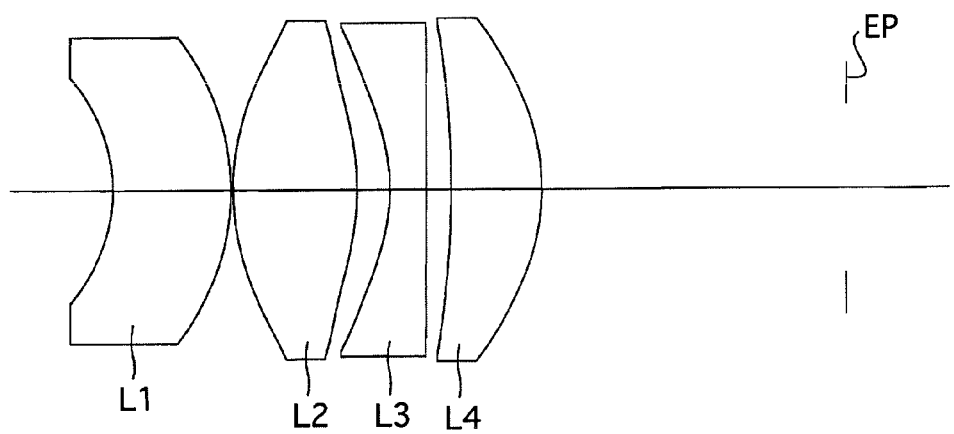
FIG. 9 shows a lens arrangement of a third numerical embodiment of an eyepiece optical system, according to the present invention.
Figures 10A, 10B, 10C, 10D:
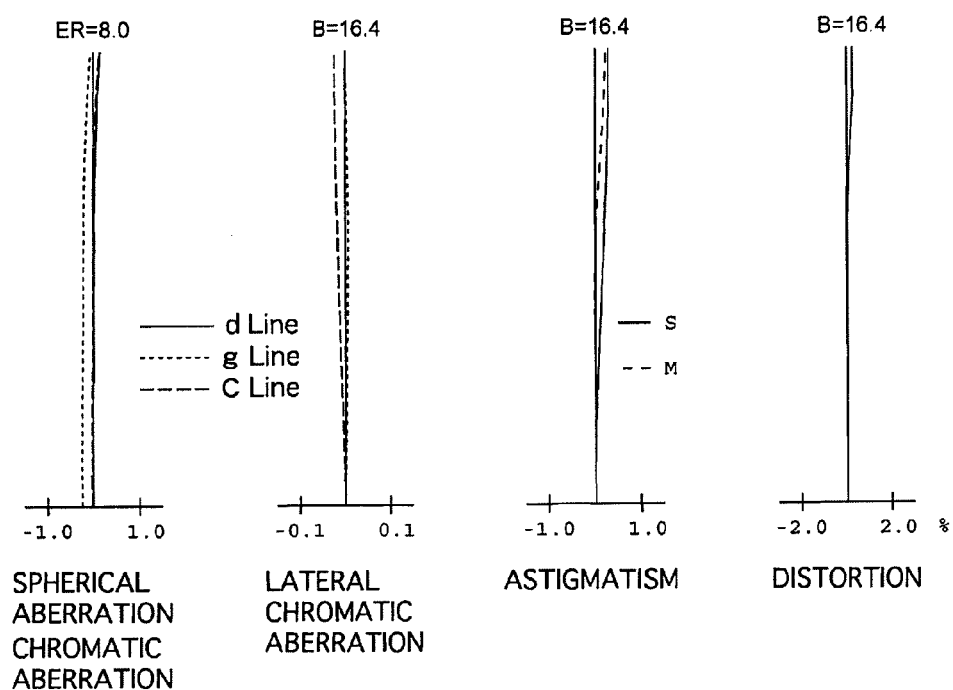
FIGS. 10A, 10B, 10C and 10D show various aberrations that occurred in the lens arrangement of FIG. 9 at a diopter of −1.

FIGS. 9 through 12D and Tables 9 through 12 show a third numerical embodiment of the eyepiece optical system according to the present invention. FIG. 9 shows the lens arrangement, FIGS. 10A, 10B, 10C and 10D show various aberration diagrams at a diopter of −1, FIGS. 11A, 11B, 11C and 11D show various aberration diagrams at a diopter of −4, and FIGS. 12A, 12B, 12C and 12D show various aberration diagrams at a diopter of +2. Table 9 shows the lens surface data, Table 10 shows the aspherical surface data, Table 11 shows various lens-system data, and Table 12 shows distance/thickness data.

The lens arrangement of the third numerical embodiment is the same as that of the first numerical embodiment.

TABLE 9

SURFACE DATA

| Surf. No. | R | d | N (d) | ν (d) |
|---|---|---|---|---|
| Object | ∞ | d0 | | |
| 1* | −7.731 | 5.589 | 1.63278 | 23.3 |
| 2 | −11.893 | 0.104 | | |
| 3* | 11.780 | 5.939 | 1.52538 | 56.3 |
| 4* | −11.718 | 1.598 | | |
| 5* | −9.127 | 1.768 | 1.63278 | 23.3 |
| 6 | −763.903 | 1.208 | | |
| 7 | −46.617 | 4.393 | 1.52538 | 56.3 |
| 8* | −10.427 | d8 | | |
| EP | ∞ | — | | |

TABLE 10

ASPHERICAL SURFACE DATA

| Surf. No. | K | A4 | A6 | A8 | A10 |
|---|---|---|---|---|---|
| 1 | 0.000 | 0.1271E−03 | −0.6176E−05 | 0.6013E−06 | −0.1114E−07 |
| 3 | 0.000 | −0.1168E−03 | 0.1096E−05 | −0.1354E−07 | −0.1830E−09 |
| 4 | 0.000 | 0.4346E−03 | 0.7328E−06 | 0.1183E−07 | −0.5137E−09 |
| 5 | 0.000 | 0.4651E−03 | 0.1506E−05 | −0.1745E−07 | 0.1867E−09 |
| 8 | 0.000 | 0.1161E−03 | 0.1067E−05 | −0.7413E−08 | 0.8186E−10 |

TABLE 11

LENS SYSTEM DATA

| Diopter | −1 | −4 | +2 |
|---|---|---|---|
| ER | φ8 | φ8 | φ8 |
| f | 16.65 | 16.65 | 16.65 |
| H | 4.89 | 4.89 | 4.89 |
| B | 16.4 | 16.6 | 16.2 |
| Eye Relief | 14.494 | 15.330 | 13.662 |

TABLE 12

DISTANCE/THICKNESS DATA

| Diopter | −1 | −4 | +2 |
|---|---|---|---|
| d0 | 5.909 | 5.073 | 6.741 |
| d8 | 14.494 | 15.330 | 13.662 |

Numerical Embodiment 4

FIGS. 13 through 16D and Tables 13 through 16 show a fourth numerical embodiment of the eyepiece optical system according to the present invention. FIG. 13 shows the lens arrangement, FIGS. 14A, 14B, 14C and 14D show various aberration diagrams at a diopter of −1, FIGS. 15A, 15B, 15C and 15D show various aberration diagrams at a diopter of −4, and FIGS. 16A, 16B, 16C and 16D show various aberration diagrams at a diopter of +2. Table 13 shows the lens surface data, Table 14 shows the aspherical surface data, Table 15 shows various lens-system data, and Table 16 shows distance/thickness data.

The lens arrangement of the fourth numerical embodiment is the same as that of the first numerical embodiment.

TABLE 13

SURFACE DATA

| Surf. No. | R | d | N (d) | ν (d) |
|---|---|---|---|---|
| Object | ∞ | d0 | | |
| 1* | −7.757 | 4.460 | 1.62133 | 24.9 |
| 2 | −20.458 | 0.098 | | |
| 3* | 9.671 | 6.584 | 1.52538 | 56.3 |
| 4* | −8.671 | 1.689 | | |
| 5* | −8.390 | 1.666 | 1.62133 | 24.9 |
| 6 | −44.103 | 0.931 | | |
| 7 | −27.233 | 3.944 | 1.52538 | 56.3 |
| 8* | −9.547 | d8 | | |
| EP | ∞ | — | | |

TABLE 14

ASPHERICAL SURFACE DATA

| Surf. No. | K | A4 | A6 | A8 | A10 |
|---|---|---|---|---|---|
| 1 | 0.000 | 0.3108E−03 | 0.5082E−05 | −0.5033E−06 | 0.1325E−07 |
| 3 | 0.000 | −0.4201E−03 | 0.2370E−05 | 0.1952E−07 | −0.4422E−09 |
| 4 | 0.000 | 0.5559E−03 | −0.1453E−05 | 0.6833E−07 | 0.7113E−10 |
| 5 | 0.000 | 0.3788E−03 | 0.1427E−05 | −0.1306E−07 | 0.7963E−09 |
| 8 | 0.000 | 0.9304E−04 | 0.1651E−05 | −0.1311E−07 | 0.2710E−09 |

TABLE 15

LENS SYSTEM DATA

| Diopter | −1 | −4 | +2 |
|---|---|---|---|
| ER | φ8 | φ8 | φ8 |
| f | 15.69 | 15.69 | 15.69 |
| H | 4.89 | 4.89 | 4.89 |
| B | 17.4 | 17.6 | 17.2 |
| Eye Relief | 14.635 | 15.377 | 13.896 |

TABLE 16

DISTANCE/THICKNESS DATA

| Diopter | −1 | −4 | +2 |
|---|---|---|---|
| d0 | 5.220 | 4.478 | 5.959 |
| d8 | 14.635 | 15.377 | 13.896 |

Numerical Embodiment 5

FIGS. 17 through 20D and Tables 17 through 20 show a fifth numerical embodiment of the eyepiece optical system according to the present invention. FIG. 17 shows the lens arrangement, FIGS. 18A, 18B, 18C and 18D show various aberration diagrams at a diopter of −1, FIGS. 19A, 19B, 19C and 19D show various aberration diagrams at a diopter of −4, and FIGS. 20A, 20B, 20C and 20D show various aberration diagrams at a diopter of +2. Table 17 shows the lens surface data, Table 18 shows the aspherical surface data, Table 19 shows various lens-system data, and Table 20 shows distance/thickness data.

The lens arrangement of the fifth numerical embodiment is that of the first numerical embodiment with the first lens element L1 replaced by a first lens element L1', which is a positive meniscus lens element having a concave surface on the object side. An aspherical surface is provided on the object side of the first lens element L1'.

TABLE 17

SURFACE DATA

| Surf. No. | R | d | N (d) | ν (d) |
|---|---|---|---|---|
| Object | ∞ | d0 | | |
| 1* | −10.185 | 5427 | 1.63278 | 23.3 |
| 2 | −11.659 | 0.100 | | |
| 3* | 20.779 | 5377 | 1.52538 | 56.3 |
| 4* | −8.955 | 1637 | | |
| 5* | −8.230 | 1692 | 1.63278 | 23.3 |
| 6 | −168.167 | 1.040 | | |
| 7 | −42.542 | 4.477 | 1.52538 | 56.3 |
| 8* | −9.754 | d8 | | |
| EP | ∞ | — | | |

TABLE 18

ASPHERICAL SURFACE DATA

| Surf. No. | K | A4 | A6 | A8 | A10 |
|---|---|---|---|---|---|
| 1 | 0.000 | −0.5971E−03 | 0.1214E−04 | −0.3283E−06 | 0.5334E−08 |
| 3 | 0.000 | 0.1542E−03 | −0.8198E−05 | 0.2191E−06 | −0.2195E−08 |
| 4 | 0.000 | 0.4589E−03 | −0.7348E−06 | 0.1109E−06 | −0.1140E−08 |
| 5 | 0.000 | 0.4188E−03 | 0.6501E−05 | −0.1314E−06 | 0.1579E−08 |
| 8 | 0.000 | 0.1016E−03 | 0.1418E−05 | −0.1573E−07 | 0.1891E−09 |

TABLE 19

LENS SYSTEM DATA

| Diopter | −1 | −4 | +2 |
|---|---|---|---|
| ER | φ8 | φ8 | φ8 |
| f | 15.93 | 15.93 | 15.93 |
| H | 4.89 | 4.89 | 4.89 |
| B | 17.1 | 17.3 | 16.9 |
| Eye Relief | 14.412 | 15.181 | 13.651 |

TABLE 20

DISTANCE/THICKNESS DATA

| Diopter | −1 | −4 | +2 |
|---|---|---|---|
| d0 | 5.469 | 4.700 | 6.230 |
| d8 | 14.412 | 15.181 | 13.651 |

Numerical Embodiment 6

Figure 21:
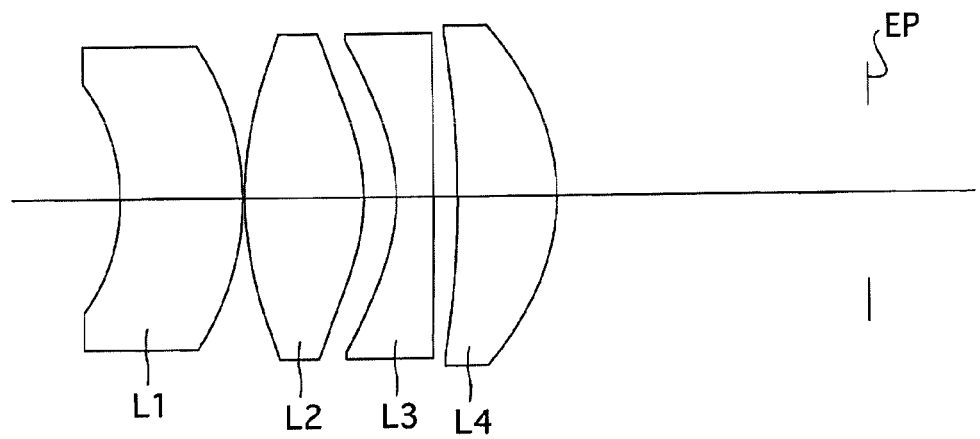
FIG. 21 shows a lens arrangement of a sixth numerical embodiment of an eyepiece optical system, according to the present invention.
Figures 22A, 22B, 22C, 22D:
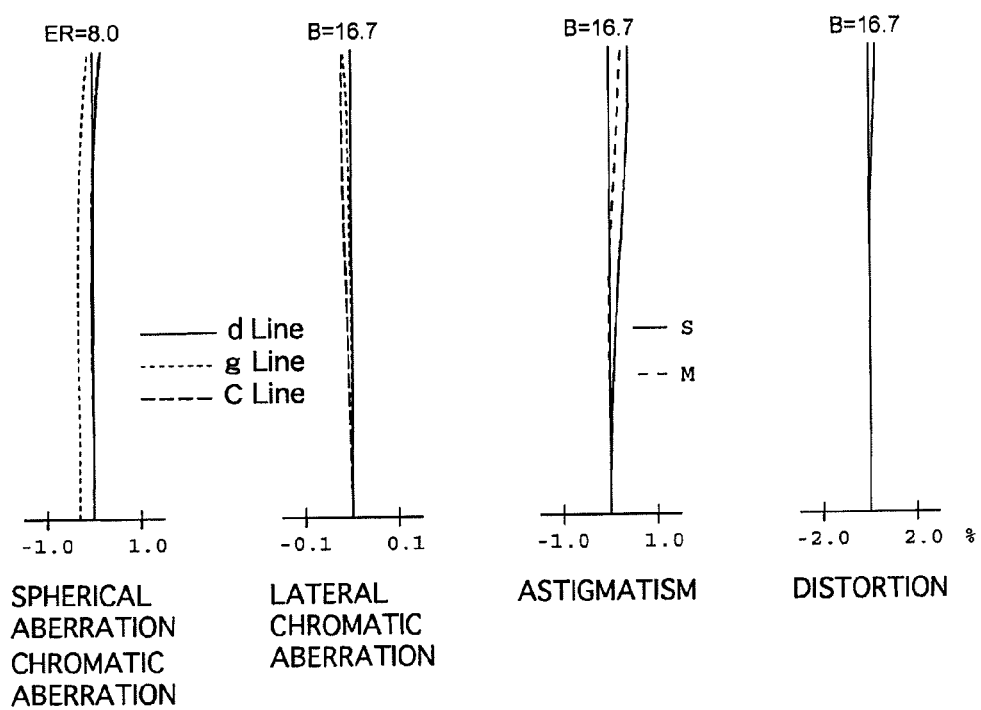
FIGS. 22A, 22B, 22C and 22D show various aberrations that occurred in the lens arrangement of FIG. 21 at a diopter of −1.

FIGS. 21 through 24D and Tables 21 through 24 show a sixth numerical embodiment of the eyepiece optical system according to the present invention. FIG. 21 shows the lens arrangement, FIGS. 22A, 22B, 22C and 22D show various aberration diagrams at a diopter of −1, FIGS. 23A, 23B, 23C and 23D show various aberration diagrams at a diopter of −4, and FIGS. 24A, 24B, 24C and 24D show various aberration diagrams at a diopter of +2. Table 21 shows the lens surface data, Table 22 shows the aspherical surface data, Table 23 shows various lens-system data, and Table 24 shows distance/thickness data.

The lens arrangement of the sixth numerical embodiment is the same as that of the first numerical embodiment.

TABLE 21

SURFACE DATA

| Surf. No. | R | d | N (d) | ν (d) |
|---|---|---|---|---|
| Object | ∞ | d0 | | |
| 1* | −9.831 | 5.703 | 1.63278 | 23.3 |
| 2 | −12.822 | 0.102 | | |
| 3* | 16.792 | 5.489 | 1.52538 | 56.3 |
| 4* | −9.121 | 1.549 | | |
| 5* | −8.320 | 1.734 | 1.63278 | 23.3 |
| 6 | −368.548 | 1.124 | | |
| 7 | −45.886 | 4.620 | 1.52538 | 56.3 |
| 8* | −9.979 | d8 | | |
| EP | ∞ | | | |

TABLE 22

ASPHERICAL SURFACE DATA

| Surf. No. | K | A4 | A6 | A8 | A10 |
|---|---|---|---|---|---|
| 1 | 0.000 | −0.1799E−03 | −0.2918E−05 | 0.2131E−06 | −0.2541E−08 |
| 3 | 0.000 | −0.6763E−04 | −0.1996E−05 | 0.1147E−06 | −0.1439E−08 |
| 4 | 0.000 | 0.4375E−03 | 0.1453E−05 | 0.7849E−07 | −0.1053E−08 |

TABLE 22-continued

ASPHERICAL SURFACE DATA

| Surf. No. | K | A4 | A6 | A8 | A10 |
|---|---|---|---|---|---|
| 5 | 0.000 | 0.5088E−03 | 0.5310E−05 | −0.1182E−06 | 0.1359E−08 |
| 8 | 0.000 | 0.1200E−03 | 0.7596E−06 | −0.8277E−08 | 0.1195E−09 |

TABLE 23

LENS SYSTEM DATA

| Diopter | −1 | −4 | +2 |
|---|---|---|---|
| ER | φ8 | φ8 | φ8 |
| f | 16.33 | 16.33 | 16.33 |
| H | 4.89 | 4.89 | 4.89 |
| B | 16.7 | 16.9 | 16.5 |
| Eye Relief | 14.456 | 15.262 | 13.656 |

TABLE 24

DISTANCE/THICKNESS DATA

| Diopter | −1 | −4 | +2 |
|---|---|---|---|
| d0 | 5.475 | 4.669 | 6.275 |
| d8 | 14.456 | 15.262 | 13.656 |

Numerical Embodiment 7

FIGS. 25 through 28D and Tables 25 through 28 show a seventh numerical embodiment of the eyepiece optical system according to the present invention. FIG. 25 shows the lens arrangement, FIGS. 26A, 26B, 26C and 26D show various aberration diagrams at a diopter of −1, FIGS. 27A, 27B, 27C and 27D show various aberration diagrams at a diopter of −4, and shows FIGS. 28A, 28B, 28C and 28D show various aberration diagrams at a diopter of +2. Table 25 shows the lens surface data, Table 26 shows the aspherical surface data, Table 27 shows various lens-system data, and Table 28 shows distance/thickness data.

The lens arrangement of the seventh numerical embodiment is that of the first numerical embodiment with the third lens element L3 replaced by a third lens element L3' which is a biconcave negative lens element, and the fourth lens element L4 replaced by a fourth lens element L4' which is a biconvex positive lens element. The third lens element L3' is provided with an aspherical surface on the object side; this aspherical surface reduces in curvature, relative to the paraxial spherical surface, at positions increasingly farther away from the optical axis. The fourth lens element L4' is provided with an aspherical surface on the eye side; this aspherical surface reduces in curvature, relative to the paraxial spherical surface, at positions increasingly farther away from the optical axis.

TABLE 25

SURFACE DATA

| Surf. No. | R | d | N (d) | ν (d) |
|---|---|---|---|---|
| Object | ∞ | d0 | | |
| 1* | −6.695 | 4.346 | 1.62133 | 24.9 |
| 2 | −11.405 | 0.100 | | |
| 3* | 9.716 | 6.244 | 1.52538 | 56.3 |
| 4* | −14.240 | 1.827 | | |
| 5* | −9.366 | 1.700 | 1.62133 | 24.9 |
| 6 | 588.235 | 0.594 | | |
| 7 | 222.500 | 4.601 | 1.52538 | 56.3 |
| 8* | −10.697 | d8 | | |
| EP | ∞ | | | |

TABLE 26

ASPHERICAL SURFACE DATA

| Surf. No. | K | A4 | A6 | A8 | A10 |
|---|---|---|---|---|---|
| 1 | 0.000 | 0.1817E−03 | 0.1502E−04 | −0.2586E−06 | 0.2820E−08 |
| 3 | 0.000 | −0.1450E−03 | −0.3489E−05 | 0.8000E−07 | −0.1007E−08 |
| 4 | 0.000 | 0.4161E−03 | −0.4326E−05 | 0.7561E−07 | −0.8003E−09 |
| 5 | 0.000 | 0.3082E−03 | −0.7022E−06 | 0.6635E−07 | −0.4050E−09 |
| 8 | 0.000 | 0.1323E−03 | 0.3607E−06 | 0.2447E−07 | −0.1391E−09 |

TABLE 27

LENS SYSTEM DATA

| Diopter | −1 | −4 | +2 |
|---|---|---|---|
| ER | φ8 | φ8 | φ8 |
| f | 15.93 | 15.93 | 15.93 |
| H | 4.89 | 4.89 | 4.89 |
| B | 17.1 | 17.3 | 16.9 |
| Eye Relief | 14.412 | 15.182 | 13.653 |

TABLE 28

| DISTANCE/THICKNESS DATA | | | |
|---|---|---|---|
| Diopter | −1 | −4 | +2 |
| d0 | 5.897 | 5.127 | 6.656 |
| d8 | 14.412 | 15.182 | 13.653 |

The numerical values of each condition for each embodiment are shown in Table 29.

TABLE 29

|  | Embod.1 | Embod.2 | Embod.3 | Embod.4 | Embod.5 | Embod.6 | Embod.7 |
|---|---|---|---|---|---|---|---|
| Cond. (1) | −0.896 | −0.468 | −0.229 | −0.675 | 0.053 | −0.064 | −0.395 |
| Cond. (2) | −1.011 | −1.481 | −1.400 | −0.767 | −1.366 | −1.273 | −1.396 |
| Cond. (3) | −0.933 | −0.875 | −1.139 | −0.924 | −1.160 | −1.211 | −1.075 |
| Cond. (4) | 0.024 | 0.183 | −0.003 | −0.055 | −0.398 | −0.296 | 0.189 |
| Cond. (5) | 1.488 | 1.454 | 1.024 | 1.470 | 1.103 | 1.046 | 0.969 |
| Cond. (6) | −1.604 | −1.663 | −1.576 | −2.080 | −1.595 | −1.556 | −0.908 |
| Cond. (7) | 0.305 | 0.306 | 0.294 | 0.312 | 0.307 | 0.299 | 0.307 |

As can be understood from Table 29, the first through seventh numerical embodiments satisfy conditions (1) through (7). As can be understood from the various aberration diagrams, the various aberrations are relatively well corrected.

INDUSTRIAL APPLICABILITY

The eyepiece optical system of the present invention is an eyepiece optical system for magnified viewing of an object, and also is ideal for use in an electronic view finder of a digital camera, a video camera, a digital telescope or digital binoculars, etc.

REFERENCE SIGNS LIST

L1 First lens element configured of a negative meniscus lens element having a concave surface on the object side
L1' First lens element configured of a positive meniscus lens element having a concave surface on the object side
L2 Second lens element configured of a biconvex positive lens element
L3 Third lens element configured of a negative meniscus lens element having a concave surface on the object side
L3' Third lens element configured of a biconcave negative lens element
L4 Fourth lens element configured of a positive meniscus lens element having a concave surface on the object side
L4' Fourth lens element configured of a biconvex positive lens element
EP Eyepoint

What is claimed is:

1. An eyepiece optical system comprising a first lens element having a meniscus shape with a concave surface on an object side of the first lens element, a positive second lens element, a negative third lens element, and a positive fourth lens element, in that order from an object side of the eyepiece optical system toward an eye side of the eyepiece optical system, wherein the following conditions are satisfied:

$-1.55 < f/R12 < -0.7$, and $-1.25 < f/f3 < -0.8$, f designates an entire focal length of the eyepiece optical system,
R12 designates a paraxial radius-of-curvature of a surface of the first lens element on an eye side of the first lens element, and
f3 designates a focal length of the third lens element.

2. The eyepiece optical system according to claim 1, wherein the following condition is satisfied:

$-2.5 < SF4 < -0.8$, $SF4 = (r42 + r41)/(r42 - r41)$, r41 designates a paraxial radius-of-curvature of a surface on an object side of the fourth lens element, and
r42 designates a paraxial radius-of-curvature of a surface on an eye side of the fourth lens element.

3. The eyepiece optical system according to claim 1, wherein the following condition is satisfied:

$-1.0 < f/f1 < 0.07$, and f1 designates a focal length of the first lens element.

4. The eyepiece optical system according to claim 1, wherein the following condition is satisfied:

$-0.45 < SF2 < 0.25$, $SF2 = (r22 + r21)/(r22 - r21)$, r21 designates a paraxial radius-of-curvature of a surface on an object side of the second lens element, and
r22 designates a paraxial radius-of-curvature of a surface on an eye side of the second lens element.

5. The eyepiece optical system according to claim 1, wherein the following condition is satisfied:

$0.8 < SF3 < 1.55$, $SF3 = (r32 + r31)/(r32 - r31)$, r31 designates a paraxial radius-of-curvature of a surface on an object side of the third lens element, and
r32 designates a paraxial radius-of-curvature of a surface on an eye side of the third lens element.

6. The eyepiece optical system according to claim 1, wherein
said second lens element comprises an aspherical surface on an eye side of the second lens element, and said aspherical surface reduces in curvature, relative to a paraxial spherical surface of said second lens, at positions increasingly farther away from an optical axis of said second lens.

7. The eyepiece optical system according to claim 1, wherein said third lens element comprises an aspherical surface on an object side of the third lens element, and said aspherical surface reduces in curvature, relative to a paraxial spherical surface of said third lens, at positions increasingly farther away from an optical axis of said third lens.

8. The eyepiece optical system according to claim 1, wherein said fourth lens element comprises an aspherical surface on an eye side of the fourth lens element, and said aspherical surface reduces in curvature, relative to a paraxial spherical surface of said fourth lens, at positions increasingly farther away from an optical axis of said fourth lens.

9. The eyepiece optical system according to claim 1, wherein said first lens element is a negative meniscus lens element having the concave surface on the object side of the first lens element, said second lens element is a biconvex positive lens element, said third lens element is a negative meniscus lens element having a concave surface on an object side of the third lens element, and said fourth lens element is a positive meniscus lens element having a concave surface on an object side of the fourth lens element.

10. The eyepiece optical system according to claim 1, wherein said first lens element is a positive meniscus lens element having the concave surface on the object side of the first lens element, said second lens element is a biconvex positive lens element, said third lens element is a negative meniscus lens element having a concave surface on an object side of the third lens element, and said fourth lens element is a positive meniscus lens element having a concave surface on an object side of the fourth lens element.

11. The eyepiece optical system according to claim 1, wherein said first lens element is a negative meniscus lens element having the concave surface on the object side of the first lens element, said second lens element is a biconvex positive lens element, said third lens element is a biconcave negative lens element, and said fourth lens element is a biconvex positive lens element.

* * * * *